US008624962B2

(12) United States Patent
Lopes et al.

(10) Patent No.: US 8,624,962 B2
(45) Date of Patent: Jan. 7, 2014

(54) SYSTEMS AND METHODS FOR SIMULATING THREE-DIMENSIONAL VIRTUAL INTERACTIONS FROM TWO-DIMENSIONAL CAMERA IMAGES

(75) Inventors: Gonçalo Cardoso Lopes, Lisbon (PT); André Rui Soares Pereira de Almeida, Almada (PT); João Pedro Gomes da Silva Frazão, Lisbon (PT); Antão Bastos Carriço Vaz de Almada, Lisbon (PT); Nuno Ricardo Sequeira Cardoso, Lisbon (PT); Ivan de Almeida Soares Franco, Almada (PT)

(73) Assignee: Ydreams—Informatica, S.A. Ydreams, Caparica (PT)

( * ) Notice: Subject to any disclaimer, the term of this patent is extended or adjusted under 35 U.S.C. 154(b) by 923 days.

(21) Appl. No.: 12/364,122

(22) Filed: Feb. 2, 2009

(65) Prior Publication Data

US 2010/0194863 A1     Aug. 5, 2010

(51) Int. Cl.
*H04N 13/02* (2006.01)
(52) U.S. Cl.
USPC ............................................................. 348/50
(58) Field of Classification Search
USPC ............................................................. 348/50
See application file for complete search history.

(56) References Cited

U.S. PATENT DOCUMENTS

| 5,210,604 A | 5/1993 | Carpenter | 358/93 |
|---|---|---|---|
| 5,365,266 A | 11/1994 | Carpenter | 348/61 |
| 5,534,917 A | 7/1996 | MacDougall | 348/169 |
| 5,850,352 A | 12/1998 | Moezzi et al. | 364/514 |
| 6,151,009 A | 11/2000 | Kanade et al. | 345/113 |
| 6,166,744 A | 12/2000 | Jaszlics et al. | 345/435 |
| 6,191,812 B1 | 2/2001 | Tzidon et al. | 348/140 |
| 6,292,215 B1 | 9/2001 | Vincent | 348/169 |
| 6,411,266 B1 | 6/2002 | Maguire, Jr. | 345/8 |
| 6,678,635 B2 | 1/2004 | Tovinkere et al. | 702/179 |
| 6,795,068 B1 * | 9/2004 | Marks | 345/419 |
| 6,856,324 B2 | 2/2005 | Sauer et al. | 345/633 |
| 6,898,307 B1 | 5/2005 | Harrington | 382/154 |

(Continued)

FOREIGN PATENT DOCUMENTS

| DE | 100 40 805 A1 | 3/2002 | G06F 19/00 |
|---|---|---|---|
| WO | WO97/46975 A1 | 12/1997 | G06T 17/50 |

(Continued)

OTHER PUBLICATIONS

Baker, et al., "A Layered Approach to Stereo Recognition", Conference on Computer Vision and Pattern Recognition, Santa Barbara, CA; 8 pages, Jun. 23, 1998.

(Continued)

*Primary Examiner* — Jerry Dennison
(74) *Attorney, Agent, or Firm* — King & Spalding L.L.P.

(57) ABSTRACT

A computer implemented method for incorporating a representation of a participant into a virtual 3D environment substantially in real-time is provided. An image including a participant is captured by a camera. A contour of the participant is automatically determined. Depth data is automatically associated with the participant contour. A first virtual 3D representation of the participant is automatically generated by extruding the participant contour based on the associated depth data. An interaction between the first virtual 3D representation of the participant and a second virtual 3D representation of a second object is displayed.

4 Claims, 10 Drawing Sheets

(56) References Cited

U.S. PATENT DOCUMENTS

| | | | |
|---|---|---|---|
| 6,950,123 B2 | 9/2005 | Martins | 348/157 |
| 6,951,515 B2 | 10/2005 | Ohshima et al. | 463/31 |
| 6,987,885 B2 | 1/2006 | Gonzalez-Banos et al. | 382/192 |
| 6,990,681 B2 | 1/2006 | Wang et al. | 725/105 |
| 7,044,613 B2 | 5/2006 | Debevee | 362/11 |
| 7,058,204 B2 | 6/2006 | Hildreth et al. | 382/103 |
| 7,139,409 B2 | 11/2006 | Paragios et al. | 382/103 |
| 7,170,492 B2 | 1/2007 | Bell | 345/158 |
| 7,173,672 B2 | 2/2007 | Gibbs et al. | 348/589 |
| 7,177,861 B2 | 2/2007 | Tovinkere et al. | 707/3 |
| 7,199,793 B2 | 4/2007 | Oh et al. | 345/419 |
| 7,209,181 B2 | 4/2007 | Kriegman | 348/586 |
| 7,227,526 B2 | 6/2007 | Hildreth et al. | 345/156 |
| 7,253,832 B2 | 8/2007 | Iwaki et al. | 348/50 |
| 7,259,747 B2 | 8/2007 | Bell | 345/156 |
| 7,277,571 B2 | 10/2007 | Hara | 382/154 |
| 7,285,047 B2 * | 10/2007 | Gelb et al. | 463/31 |
| 7,348,963 B2 | 3/2008 | Bell | 345/156 |
| 7,348,989 B2 | 3/2008 | Stevens et al. | 345/582 |
| 7,379,566 B2 | 5/2008 | Hildreth | 382/107 |
| 7,385,600 B2 | 6/2008 | Marion | 345/419 |
| 7,389,591 B2 | 6/2008 | Jaiswal et al. | 33/366.11 |
| 7,421,093 B2 | 9/2008 | Hildreth et al. | 382/103 |
| 7,427,996 B2 | 9/2008 | Yonezawa et al. | 345/629 |
| 7,428,542 B1 | 9/2008 | Fink et al. | 707/100 |
| 7,430,312 B2 | 9/2008 | Gu | 382/154 |
| 8,072,470 B2 * | 12/2011 | Marks | 345/632 |
| 2002/0186314 A1 | 12/2002 | Debevec | 348/371 |
| 2003/0012408 A1 | 1/2003 | Bouguet et al. | 382/103 |
| 2003/0038813 A1 | 2/2003 | Lu | 345/582 |
| 2003/0071810 A1 * | 4/2003 | Shoov et al. | 345/420 |
| 2004/0183775 A1 | 9/2004 | Bell | 345/156 |
| 2004/0193313 A1 | 9/2004 | Cornet et al. | 700/231 |
| 2005/0018045 A1 | 1/2005 | Thomas et al. | 348/157 |
| 2005/0088407 A1 | 4/2005 | Bell et al. | 345/156 |
| 2005/0089194 A1 | 4/2005 | Bell | 382/103 |
| 2005/0093889 A1 | 5/2005 | Sauer et al. | 345/633 |
| 2005/0099414 A1 * | 5/2005 | Kaye et al. | 345/419 |
| 2005/0110964 A1 | 5/2005 | Bell et al. | 353/122 |
| 2005/0122308 A1 | 6/2005 | Bell et al. | 345/156 |
| 2005/0162381 A1 | 7/2005 | Bell et al. | 345/156 |
| 2005/0204287 A1 | 9/2005 | Wang | 715/716 |
| 2006/0074921 A1 | 4/2006 | Lefevre | 707/100 |
| 2006/0188849 A1 | 8/2006 | Shamaie | 434/85 |
| 2006/0192782 A1 | 8/2006 | Hildreth | 345/156 |
| 2006/0210112 A1 | 9/2006 | Cohen et al. | 382/103 |
| 2006/0250395 A1 | 11/2006 | Kwon et al. | 345/424 |
| 2006/0258457 A1 | 11/2006 | Brigham | 463/36 |
| 2006/0260624 A1 | 11/2006 | Schur et al. | 128/898 |
| 2007/0031005 A1 | 2/2007 | Paragios et al. | 382/103 |
| 2007/0057940 A1 | 3/2007 | Petschnigg et al. | 345/419 |
| 2007/0236485 A1 | 10/2007 | Trepte | 345/207 |
| 2008/0018595 A1 | 1/2008 | Hildreth et al. | 345/156 |
| 2008/0018668 A1 | 1/2008 | Yamauchi | 345/633 |
| 2008/0030460 A1 | 2/2008 | Hildreth et al. | 345/156 |
| 2008/0056536 A1 | 3/2008 | Hildreth et al. | 382/103 |
| 2008/0062123 A1 | 3/2008 | Bell | 345/156 |
| 2008/0137913 A1 | 6/2008 | Hildreth | 382/107 |
| 2008/0150890 A1 | 6/2008 | Bell et al. | 345/156 |
| 2008/0150913 A1 | 6/2008 | Bell et al. | 345/175 |
| 2008/0166022 A1 | 7/2008 | Hildreth | 382/107 |
| 2008/0187178 A1 | 8/2008 | Shamaie | 382/103 |
| 2008/0199071 A1 | 8/2008 | Gu | 382/154 |
| 2008/0205701 A1 | 8/2008 | Shamaie et al. | 382/103 |
| 2008/0218515 A1 | 9/2008 | Fukushima et al. | 345/424 |
| 2008/0219502 A1 | 9/2008 | Shamaie | 382/103 |
| 2008/0235965 A1 | 10/2008 | Jaiswal et al. | 33/366.11 |
| 2008/0252596 A1 | 10/2008 | Bell et al. | 345/156 |
| 2008/0267447 A1 | 10/2008 | Kelusky et al. | 382/100 |
| 2008/0273755 A1 | 11/2008 | Hildreth | 382/103 |
| 2010/0014781 A1 * | 1/2010 | Liu et al. | 382/285 |

FOREIGN PATENT DOCUMENTS

| | | | | |
|---|---|---|---|---|
| WO | WO 02/39382 A2 | 5/2002 | | G06T 15/20 |
| WO | WO 2006/112743 A1 | 10/2006 | | G07F 17/02 |
| WO | WO 2007/017597 A2 | 2/2007 | | G06T 15/00 |
| WO | WO 2007/017600 A2 | 2/2007 | | H04N 5/262 |
| WO | WO 2010/087729 | * 8/2010 | | H04N 13/00 |

OTHER PUBLICATIONS

Erdem, et al., "Temporal Stabilization of Video Object Segmentation for 3D-TV Applications", Signal Processing: Image Commumication, vol. 20, No. 2; pp. 151-167, Feb. 1, 2005.

Kanade, et al., "Virtualized Reality: Constructing Virtual Worlds from Real Scenes", IEEE Multimedia, IEEE Service Center, New York, NY; vol. 4, No. 1; pp. 34-47, Jan. 1, 1997.

Park, et al., "Efficiently Capturing Object Contours for Non-Photorealistic Rendering", Image Analysis: 15th Scandinavian Conference, Lecture notes in Computer Science, Springer Berlin Heidelberg, pp. 442-451, Jun. 10, 2007.

Vedula, et al., "Modeling, Combining, and Rendering Dynamic Real-World Events from Image Sequences", The Robotics Institute, Carnegie Mellon University, Proceedings International Conference on Virtual Systems and Multimedia; vol. 1, pp, 326-332, Nov. 18, 1998.

International PCT Search Report, PCT/PT2009/000064, 2 pages, Mar. 4, 2010.

Seneca, "A Falar Para O Boneco", Portugal Faz Bern Realidade Aumentada, with English translation, 5 pages, 2008.

Lok, "Online Model Reconstruction for Interactive Virtual Environments", University of North Carolina at Chapel Hill, Dept. of Computer Science, 5 pages, 1999.

Sawhney et al., "Video Flashlights—Real Time Rendering of Multiple Videos for Immersive Model Visualization", Vision Technologies Laboratory, 12 pages, 2002.

Lepetit et al., "Monocular Model-Based 3D Tracking of Rigid Objects: A Survey", vol. 1, No. 1, pp. 1-89, 2005.

Mascioni, "Gesture-Based Digital Signage: A New Marketing Future", Media Coverage, Gesturetek II Corporate Information, http://www.gesturetek.com/newscenter/media.php?media=28, 3 pages, Oct. 30, 2008.

Beck, "CES: 3DV Systems Does Wii-Like Fun With No Controller", The Technology Chronicles: CES: 3DV Systems does Wii-Like Fun With No Controller, http://www.sfgate.com/cgi-bin/blogs/sfgate/detail?blogid=19%&entry_id=23275, 2 pages, Oct. 30, 2008.

Billinghurst, "The MagicBook—Moving Seamlessly Between Reality and Virtuality", Univ. of Washington, 3 pages, May/Jun. 2001.

Fumanski et al., "Augmented-Reality Visualizations Guided by Cognition: Perceptual Heuristics for Combining Visible and Obscured Information", HRL Laboratories, LLC, 10 pages, 2002.

Line-Plane Intersection, From Wikipedia, the free encyclopedia, http://en.wikipedia.org/wiki/Line-plane_intersection, 3 pages, Jan. 12, 2009.

Murph, Flapi: Ydreams' Augmented Reality Mascot, http://engadget.com/2008/04/19/flapi-ydreams-augmented-reality-mascot/, 8 pages, Apr. 19, 2008.

Video Texturing on the ATI Rage 128 with Direct3D, AMD Developer Central, http://developer.amd.com/gpu/archive/Rage128SDKSampleCodeandDemos/VideoTextruingonRage128withDirect3D/Pages/de . . . , 2 pages, Nov. 17, 2008.

* cited by examiner

SYSTEMS AND METHODS FOR SIMULATING THREE-DIMENSIONAL VIRTUAL INTERACTIONS FROM TWO-DIMENSIONAL CAMERA IMAGES

TECHNICAL FIELD

The present disclosure relates generally to graphics processing techniques and more particularly to the use of a single camera in three dimensional graphics applications.

BACKGROUND

Three-dimensional (3D) graphics processing and display are powerful technologies for capturing and retaining a person's attention. This is because 3D video productions and holographic displays capture a degree of realism or invoke greater perceived familiarity that a two-dimensional (2D) production or display simply cannot match. A prime application of 3D processing is in the areas of augmented reality (AR) and augmented virtuality (AV). These two different terms generally describe approaches to integrating information or context from a real environment with a virtual (or computer generated) one, but in AR the real elements predominate while in AV the virtual ones predominate. Similar to AR, many special effects in television programs and movies incorporate virtual images with computer generated ones. Alternatively, primarily animated programs that occasionally incorporate images, video, or the motions (e.g., animating a computer generated character based on the observed motions of an actor) of real actors or scenes are closer to AV. AR and AV differ from movies and most television in that they are typically performed in real-time with live participants.

The term participant is used in the present disclosure because AR and AV applications are generally interactive in nature such that a person captured by the camera or cameras of such a system is invited to participate in some activity or experience. The real-time interface allows a participant to interact with a virtual scene or virtual 3D object and see those interactions as they happen. For the purposes of the present disclosure, the term AR will be used inclusively to refer to augmented reality and augmented virtuality applications.

Existing techniques for capturing information about a participant and the participant's environment and then registering that information in 3D typically require specialized hardware components and/or complex setups of hardware components. The term registration is used to describe direct capture or inference of the 3D position and volume of a participant. The registration process is analogous to an architect adding a realistic model of an existing building to a 3D model of a downtown block to show a model of a planned building design in the context of its intended location. In this analogy, the entire model represents the virtual 3D scene with 3D representations of existing real buildings and a 3D representation of a purely virtual building. Registration in the context of AR includes direct measurement of a participant and entry of the participant's measurements, and also includes inferences based on one or more observations of the participant.

In one example of a system for registering a participant in a virtual 3D scene, two or more cameras may be used in a carefully positioned arrangement (e.g., a stereoscopic camera rig) to enable computerized depth perception. Alternatively, a specialized time-of-flight camera provides a similar level of depth perception using special sensor and/or lighting elements. In yet another setup, a laser range-finder or radar setup may provide this depth information to augment video captured by a camera. Finally, additional information may be gathered from the scene by projecting (typically intermittently) a uniform grid across the camera's field of view (much like a high end digital camera auto focuses its lens) or by using fiducial markers (easily recognized reference markers) attached to the participant. The latter technique is used in medical imaging and studio production of movies and television.

Each of these techniques has limitations such as a requirement for specialized hardware or complex arrangements of hardware, significant computer processing requirements that make real-time interaction expensive and difficult, and/or require a participant to first attach tags or markers to their body and/or clothing before participating in the AR environment.

SUMMARY

In accordance with the teachings of the present disclosure, disadvantages and problems associated with the use of specialized hardware, complex arrangements of hardware, and undesirable participant constraints in virtual and augmented reality applications have been reduced.

In certain embodiments, a computer implemented method for incorporating a representation of a participant into a virtual 3D environment substantially in real-time is provided. An image including a participant is captured by a camera. A contour of the participant is automatically determined. Depth data is automatically associated with the participant contour. A first virtual 3D representation of the participant is automatically generated by extruding the participant contour based on the associated depth data. An interaction between the first virtual 3D representation of the participant and a second virtual 3D representation of a second object is displayed.

In certain embodiments, software embodied in tangible computer-readable media is provided. The software is executable by a processor to: receive an image captured by a camera, the image including a participant; determine a contour of the participant; associate depth data with the contour of the participant; generate a first virtual 3D representation of the participant by extruding the contour based on the associated depth data; determine an interaction between the first virtual 3D representation of the participant and a second virtual 3D representation of a second object based at least on the extruded contour; and cause a display of the interaction between the first virtual 3D representation of the participant and the second virtual 3D representation of a second object based at least on the extruded contour. The computer software is operable to perform such functions substantially in real-time.

In certain embodiments, a computing system includes a processor, memory coupled to the processor, and an interactive media subsystem. The interactive media subsystem is enabled to receive an image captured by a camera, the image including a participant; automatically determine a contour of the participant; automatically associate depth data with the contour of the participant; automatically generate a first virtual 3D representation of the participant by extruding the contour based on the associated depth data; determine an interaction between the first virtual 3D representation of the participant and a second virtual 3D representation of a second object based at least on the extruded contour; and automatically cause a display of the interaction between the first virtual 3D representation of the participant and the second virtual 3D representation of a second object based at least on the extruded contour. The interactive media subsystem operates substantially in real-time.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
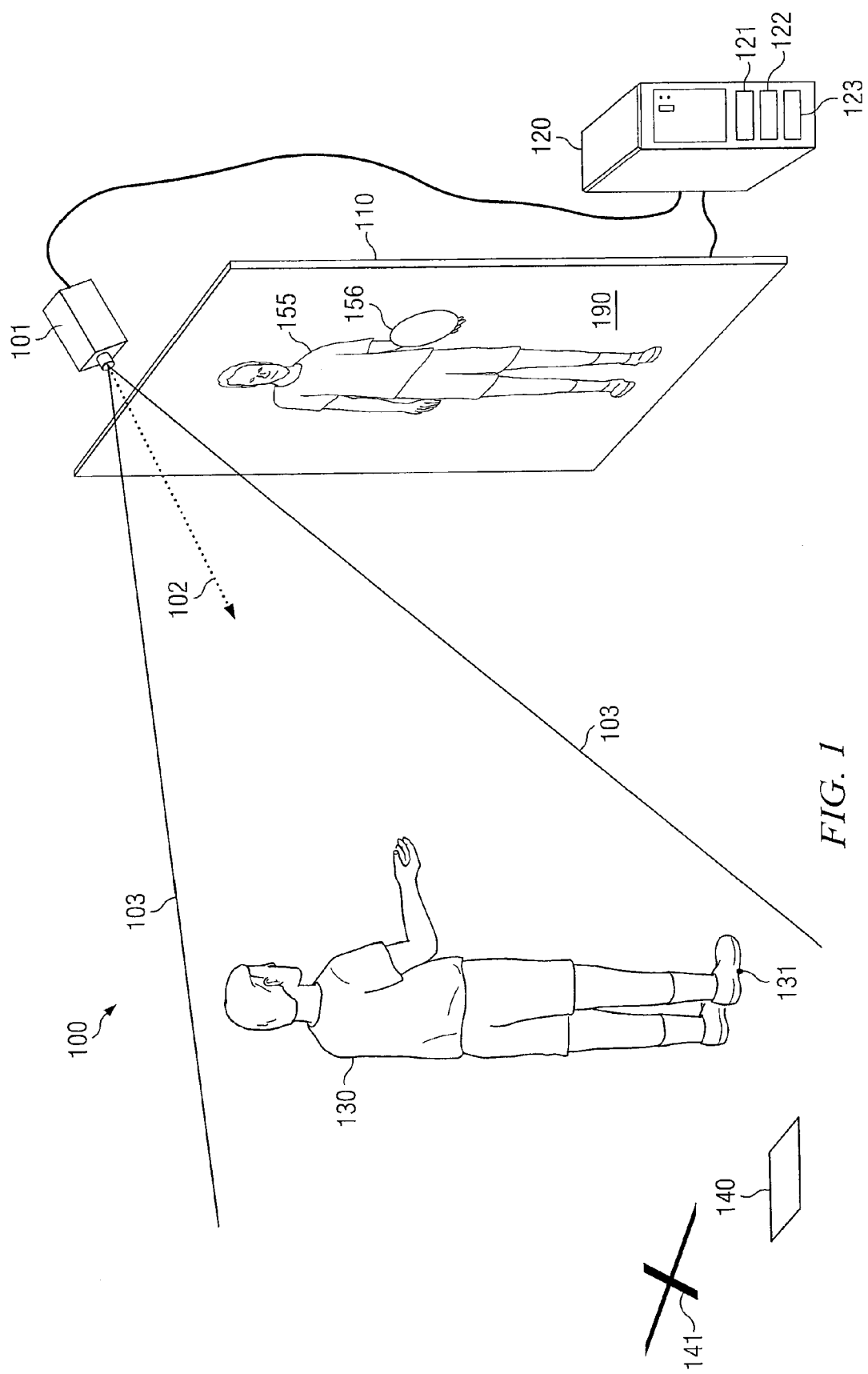
FIG. 1 illustrates an interactive media system for capturing a video image of a participant and displaying a virtual 3D scene that incorporates a virtual 3D representation of the participant, according to an example embodiment of the present disclosure.

Preferred embodiments and their advantages are best understood by reference to the figures below. However, the present disclosure may be more easily understood in the context of a high level description of certain embodiments.
System Overview In general, the present disclosure describes systems and methods for recording a participant (e.g., a person) using a video camera, and generating and displaying a virtual 3D representation of the participant in real time. In certain embodiments, an image of a participant is captured by a single camera, the participant's contour (e.g., outline) is determined, depth data is associated with the contour, a 3D solid representation of the participant is generated by extruding the contour according to the depth data, and the generated 3D solid representation of the participant is introduced into a virtual 3D scene that may be displayed to the participant. In certain embodiments, the virtual 3D representation of the participant interacts with other virtual elements in the virtual 3D scene (e.g., as determined by a physics engine), and the interactions are displayed to the participant.

One example embodiment includes an interactive media system including a video camera, a computer and a display. The system may be designed to capture and retain the attention of a person (referred to herein as a participant) in the field of view of the video camera. The video camera captures a series of images (e.g., frames) that include the participant. For each image, and in real-time, the system determines a 2D contour (e.g., outline) of the participant, extends the 2D contour into a 3D volume, and inserts that 3D representation into a virtual 3D scene. This virtual 3D scene may also include virtual 3D representations of other participants and/or other virtual 3D objects. For example, the virtual 3D scene may be a room with a virtual bubble machine throwing virtual bubbles into the air to float down to the floor and pop, and the 3D representation of the person inserted into the virtual 3D scene may interact with the virtual bubbles. The virtual 3D scene is displayed to the person in real time such that the participant move around within the field of view of the camera to interact with the virtual bubbles. The processing time from image capture to display of the virtual 3D scene may be substantially in real-time such that the participants can coordinate their movements relative to the virtual bubbles.

In some embodiments, a true, real-time scheduling environment is utilized such that processing of the virtual 3D scene is guaranteed to occur as least as fast as the input frame rate from the camera. The input frame rate may be the camera frame rate or a selected subset of frames captured by the camera (e.g., only processing every fourth frame from the camera, which is capturing sixty frames per second, gives an input frame rate of 15 frames per second). In other embodiments, processing is performed substantially in real-time (e.g., through the use of a sufficiently high performance computer system 120) wherein an occasional, intermittent inability to timely process an incoming camera frame may not interfere with a participant's interaction with the system. This occasional inability to process a frame in time is much like a dropped frame on a digital video stream of a sporting event, where the viewer might notice the dropped frame, but he can still see the progress of the game. In all cases, some time lag between the participant moving and the display reflecting the new position of the participant will exist, but if minimized this lag will not interfere with the participant's ability to interact with one or more virtual 3D objects.

In this example "virtual bubble" scenario, various interactions are possible between the virtual 3D representation of a participant—referred to herein as a "virtual participant"—and a virtual bubble in the displayed virtual scene. For example, contact between the virtual participant and a virtual bubble may cause the virtual bubble to stick to the virtual participant, bounce, or pop. As another example, a virtual bubble may pass in front of or behind the virtual participant. If a virtual bubble passes in front of the virtual participant, it may completely or partially obscure the displayed view of the virtual participant and may cast a shadow on the virtual participant. Alternatively, a virtual bubble may distort a part of the image of the virtual participant rather than obscure it. If a virtual bubble passes behind the virtual participant, the virtual bubble may disappear on one side of the virtual participant and then reappear on the other side. As yet another example, if there are two or more virtual participants, a virtual bubble may pass between two of the virtual participants or pass by one and collide with another. The system may enforce the laws of physics—or some approximation to allow real-time processing of each captured image—to give the scene a more realistic appearance. For example, the system may include a physics engine to determine and manage interactions between virtual participants and other virtual 3D objects in the virtual 3D scene.

As discussed above, a virtual participant is generated based on a 2D contour of a participant extracted from a captured video image. In some embodiments, the 3D position of the virtual participant is estimated based on an assumption that the participant is standing on the ground. With this assumption combined with some system calibration, the relative position of the participant's contour within the camera image can be converted into a 3D position. However, the single camera alone cannot capture the depth—the third dimension—of the participant. Thus, the system generates depth data for the participant, e.g., based on a system of depth rules. In some embodiments, the system assumes that each participant has a uniform depth and extrudes the contour to that depth.

An analogous process would be to convert a picture of a person into a life-size, cardboard cut-out; make a duplicate cut-out; space the original and duplicate cut-outs a few inches apart; and enclose the space between the two cut-outs to form a 3D approximation of a person. The approximation is crude, but grossly captures the general dimensions of that person.

In other embodiments, the system generates a non-uniform depth for the participant based on a particular algorithm or other depth rules. For example, the system may generate a tapered depth or a curved or rounded depth for a participant.

As used herein, the term "participant" refers to a person or other physical object in the field of view of the video camera that is inserted into a virtual 3D scene, e.g., as discussed below. This term broadly includes, e.g., humans, animals, plants, machines, and any other moving or stationary objects. For example, if a person is pushing a cart through the video camera's field of view, the cart may be treated as a participant and inserted into a virtual 3D scene for causing interactions with other virtual 3D objects.

Although certain example embodiments are described in detail below, it should be understood that various changes, substitutions and alterations can be made to the embodiments without departing from their spirit and scope.

Preferred embodiments and their advantages are best understood by reference to FIGS. 1 through 11, wherein like numbers are used to indicate like and corresponding parts.

Example System

FIG. 1 illustrates an interactive media system 100 for capturing a video image of a participant and displaying a virtual 3D scene that incorporates a virtual 3D representation of the participant, according to an example implementation of the present disclosure. System 100 includes a video camera 101, a display 110, and a computer system 120. A participant (here, a person) 130 is standing on the ground (with point 131 representing a point of contact between participant 130 and the ground), and is facing generally in the direction of camera 101. System 100 may also include one or more reference markers, e.g., reference markers 140 and/or 141. Display 110 displays a view of a virtual 3D scene 190 that includes a virtual participant 155 (which is a virtual 3D representation of participant 130) holding a virtual ball 156.

System 100 may include the hardware and software components embodying the present disclosure. System 100 may be situated in a public place (e.g., a shopping mall, a public sidewalk, or a store) or in a private place (e.g., in a home, a classroom, or a conference room). System 100 may be an interactive advertisement, a game, or a conferencing setup, for example. System 100 may be in communication with one or more other systems 100 to allow shared elements in virtual scenes 190 (e.g., a virtual tennis match where the shared elements include the net and ball). In some embodiments, camera 101, display 110, and computer system 120 may be incorporated into a single kiosk or other integrated structure while in others they may be physically separated components coupled via wires and/or wirelessly. In some embodiments, multiple cameras 101 and displays 110 may be used with one or more computer system 120. In the displayed example, camera 101 is located above and in close proximity to display 110. Alternatively, camera 101 may be located to the side or, below, behind, remote from, or in any other location relative to display 110. As another example, camera 101 may be installed directly above or directly below participant 130 (e.g., aimed through a mesh or glass floor). As another example, if display 110 includes a projection screen or a collection of display panels, camera 101 may be located within the overall boundary of the screen or collection of display panels.

Camera 101 may be any type of video camera or other camera configured to capture a stream of images, e.g., an analog video camera, a security camera, a webcam, or a point and shoot digital camera. Camera 101 provides a stream of images or video data to computer system 120. For the purposes of this disclosure, video data is treated as a series of images, even though actual video data is typically encoded (to save space and/or bandwidth) into a repeating sequence of a full frame (a full image) followed by several partial frames indicating changes to the full frame. This treatment is appropriate because it is possible to decode such a repeating sequence of full and partial frames into a series of full frames by applying the indicated changes to the full frame and storing the results in memory (e.g., memory 122 of computer system 120). If image or video data is provided by the camera as analog data, system 100 may include an analog-to-digital converter to enable input of image or video data into computer system 120. In some embodiments, camera 101 is a high resolution digital camera capable of capturing accurate and high-fidelity images of the scene including participant 130 for greater realism. In other embodiments, camera 101 is a low resolution, monochrome, or infrared digital camera, which may reduce the processing complexity and/or provide alternative visual effects. Camera 101 may be a time-of-flight camera or other specialized 3D camera, but the approach of the present disclosure does not require the additional 3D information captured by such a camera.

As shown in FIG. 1, camera 101 is aimed along ray 102 and captures a field of view 103. Optical distortion caused by one or more lenses of camera 101 may be corrected for or may be ignored. While camera 101 is a physical object incorporating having a volume and including various components (e.g., one or more lenses, one or more light sensor arrays, and an enclosure), camera 101 is treated as a single point in space for the purposes of the geometric calculations discussed herein.

Display 110 includes any suitable system or device for displaying virtual scene 190. For example, display 110 may be a monitor, a flat-panel display, or a projector and projection screen or wall. In the example embodiment shown in FIG. 1, display 110 is located just below camera 101 such that virtual 3D participant 155 in virtual scene 190 appears to participant 130 as a near mirror image view of participant 130. Alternatively, display 110 may be oriented away from the field of view of camera 101 to enable other applications. For example, participant 130 (in field of view 103) may be asked to navigate a virtual maze based on verbal instructions from an observer viewing display 110 or based on audible feedback indicating proximity to or collision with a maze wall. In contrast, if display 110 is placed remote from camera 101, participant 130 may see, e.g., a top, bottom, or a side-view of himself on display 110, which may cause perceptual dissonance for participant 130.

A wearable or portable display 110 (e.g., 3D goggles, a tablet computer, or a video-enabled cell phone) coupled to a fixed camera may cause a similar perceptual dissonance if worn or held by the participant. This perceptual dissonance may be desirable in some cases (e.g., an art system). Further, a wearable or portable display 110 can be used with a similarly portable camera 101. For example, in some embodiments, portable display 110 is integrated with camera 101 and computer system 120 (e.g., in a camera phone, or a laptop computer with webcam) while in other embodiments portable display 110 and portable camera 101 are each coupled to a remote computer system 120. In these embodiments, system 100 may include additional elements for providing regularly updated position and orientation information regarding camera 101 and/or participant 130. For example, a set of reference markers 140 and/or 141 may be placed around a room such that one or more is always within field of view 103; or camera 101 may be coupled to one or more sensors for determining the position and orientation of camera 101 relative to objects in the camera's field of view.

Computer system 120 may be any type of general purpose or specialized computer system incorporating at least one processor 121 and at least one memory 122. Processor 121 executes instructions retrieved from memory 122 to process received image data from camera 101, generate virtual 3D participant 155, generate virtual 3D scene 190, and output virtual scene 190 to display 110. In certain embodiments, computer system 120 may be a personal computer running an operating system from APPLE, MICROSOFT, or one of the various distributions of UNIX. In these embodiments, processor 121 may be, for example, an X86 compatible processor connected to memory 122 including volatile random access memory (RAM) and non-volatile program and/or data storage (e.g., hard drive, flash drive, or solid-state storage). Some embodiments may also include a video graphics processor, which may further include video memory usable as memory 122. In other embodiments, computer system 120 may be a laptop computer, a video game console, an embedded system, a cell phone, a personal digital assistant, or any other type of computing device. Memory 122 may store software or firmware instructions for performing some or all of the data processing steps of the present disclosure.

Figure 2:
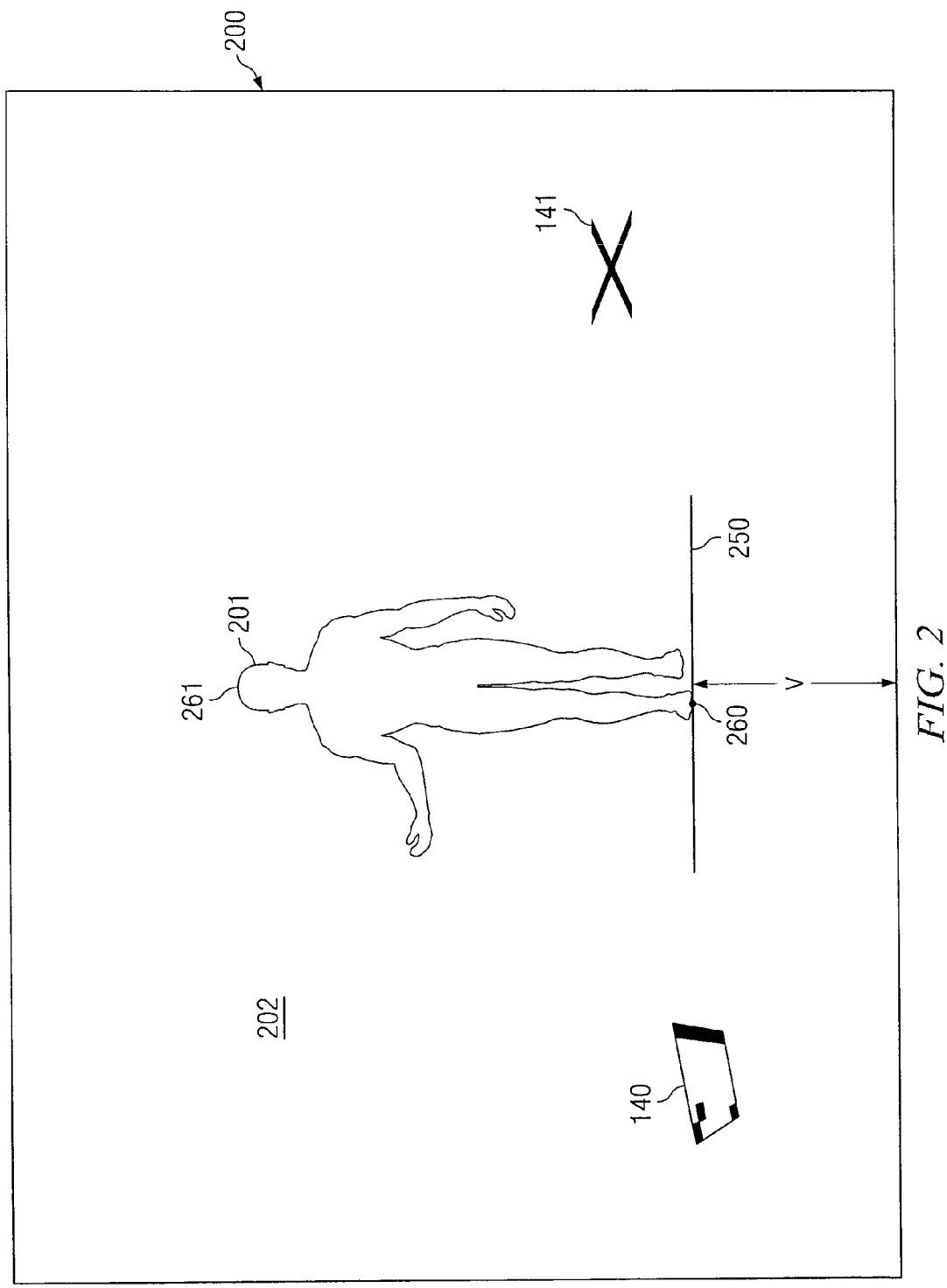
FIG. 2 illustrates representative elements of an image captured by a camera, including a contour of a participant, according to certain embodiments of the present disclosure.

Reference markers 140 and 141 are reference objects (e.g., fiducial markers) designed to be automatically recognized by computer system 120 when observed in an image captured by camera 101. Reference marker 140 may be a planar fiducial marker located on the floor within field of view 103. Marker 140 may include at least four distinct, recognizable points, e.g., as known in the field of AR applications. Reference marker 140 is shown in FIG. 2 with exaggerated perspective distortion, for illustrative purposes. The at least four recognizable points allow computer system 120 to determine the orientation of the marker regardless of the camera perspective even if only one marker 140 is in field of view 103. Based in part on this determination, computer system 120 can also determine the position and orientation of camera 101. Multiple markers may still be useful, e.g., where participants may occasionally obscure all or part of a marker 140, or where camera 101 is moveable. Reference marker 140 may have additional features that enable computer system 120 to determine and counteract optical distortions introduced by the focusing system of camera 101.

Reference marker 141 is an alternative reference object, particularly a shaped object (e.g., the letter "X" drawn on the floor or on a wall or other object, or a three dimensional object such as a sphere or box) or a regularly repeating, automatically recognizable point. In some embodiments, computer system 120 may be able to determine the position and orientation of camera 101 automatically, e.g., by analyzing four or more markers 141 in field of view 103.

FIG. 2 illustrates representative elements of an image 200 captured by camera 101, including a contour 201 of participant 130, according to certain embodiments of the present disclosure. Image 200 may be a still image or video stream frame captured by camera 101. Image 200 is a 2D picture including at least one participant 130 located within the camera's field of view 103. Image 200 may be compressed or uncompressed, color or monochromatic, data representing the camera's field of view 103. Image 200 is comprised of pixels, each represented by one or more bits of data further representing monochrome darkness or color information.

Image 200 includes a participant contour 201 and a background image 202 (partially obscured by participant contour 201). Participant contour 201 represents the outer contour, or outline, of participant 130 in image 200, and may be determined by computer system 120 in any suitable manner, as described below. Participant contour 201 contacts a ground plane 250 at one or more ground contact points 260. The topmost point on participant contour 201 is represented by a top contour point 261. Image 200 may include any number of reference markers, e.g., markers 140 and/or 141.

Figure 3:
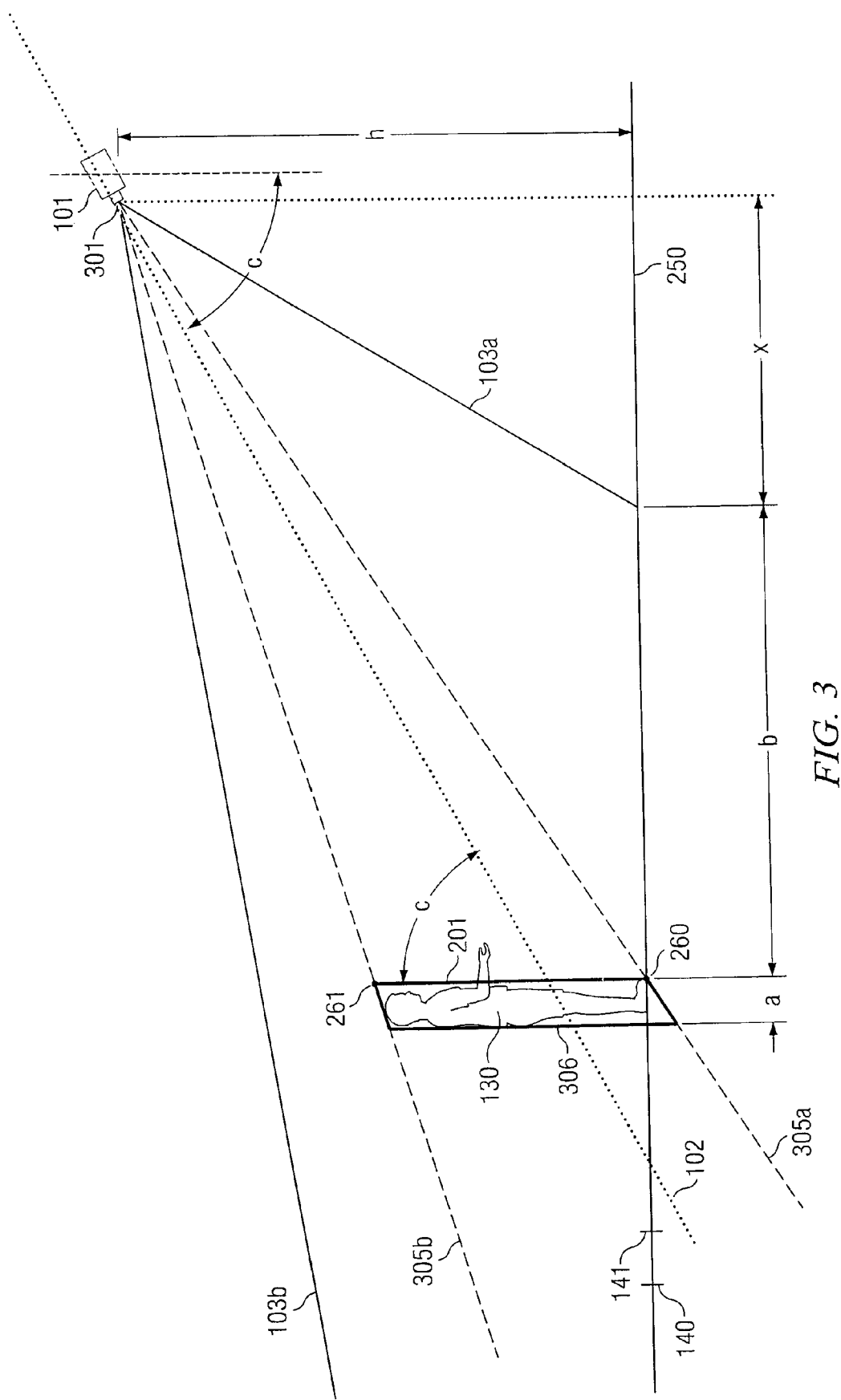
FIG. 3 is a side view of the system of FIG. 1 illustrating various geometric relationships between certain elements of the system, according to certain embodiments of the present disclosure.

FIG. 3 is a side view of system 100 illustrating various geometric relationships between certain elements of system 100, according to certain embodiments of the present disclosure. Camera 101 is located at camera reference point 301, located at height h above ground level 250. The camera's field of view 103 is bounded by lines 103a and 103b. Camera 101 is oriented along ray 102, which is angled at c degrees from vertical. In this side view, participant contour 201 appears as a vertical line extending upward from ground plane 250. Participant contour 201 is located at a horizontal distance b from the edge of the field of view 103a, and located at a horizontal distance b plus distance x from camera reference point 301. Lines 305a and 305b represent a cone originating at camera reference point 301 and intersecting the topmost and bottommost visible points—points 261 and 260, respectively—of participant contour 201. One or more reference points, e.g., markers 140 and/or 141, may be located along ground plane 250 within the field of view of the camera.

System Calibration

Various aspects of system 100 may be calibrated in order to determine location and/or dimension data regarding a participant in field of view 130 (e.g., participant 130 shown in FIGS. 1-3) such that participant 130 may be accurately modeled in 3D in virtual 3D scene 190. Such calibrations may include any or all of the following:

(a) determining a physical location and/or orientation of camera 101;

(b) generating or accessing one or more formulas and/or look-up tables for determining a 3D physical location of a participant 130 based on the location (e.g., pixel) of the participant 130 within an image 200 captured by camera 101;

(c) generating or accessing one or more formulas and/or look-up tables for determining a height of a participant 130 based on (a) aspects of the participant contour 201 (e.g., the distance between the bottom and topmost points 260 and 261 of contour 201) and/or (b) the location of participant contour 201 within image 200;

(d) generating or accessing one or more formulas and/or look-up tables for determining a depth (e.g., dimension a shown in FIG. 3) for which to extrude participant contour 201 to generate a virtual 3D representation of participant 130 (e.g., virtual 3D participant 155 shown in FIG. 1) for use in virtual 3D scene 130; and/or (e) any other suitable calibrations for determining any location and/or dimension data regarding participant 130 or other aspect of system 100.

Any or all of calibrations (b), (c), and (d) may be based at least in part on calibration (a), the physical location and/or orientation of camera 101. Conversely, any or all of calibrations (b), (c), and (d) may be determined without using camera location and/or orientation data. Each of the calibration types (a)-(d) are discussed below.

A. Calibrating Physical Location and/or Orientation of Camera 101.

The physical location and/or orientation of camera 101 may be calibrated manually, semi-automatically, or automatically. In a manual calibration, the location of one or more physical reference points (e.g., visual markers 140 and 141 or other reference points) relative to camera 101 may be manually measured (e.g., using a measuring tape), and the measurements then manually input into computer system 120. In a semi-automatic calibration method, a graphical user interface may display an image 200 (or background image 202), and allow a user to select physical reference points on the image and enter manually determined distances/locations for the selected physical reference points. In an automatic calibration method, computer system 120 may automatically identify one or more visual markers 140 and/or 141, extract information from visual markers 140 and/or 141, and apply one or more geometric algorithms to determine the physical position and/or orientation of camera 101.

In some embodiments, if a planar fiducial marker 140 is used, the well-known size and layout of the graphical elements in the marker allow computer system 120 to precisely determine the perspective of camera 101. Alternatively, this approach works with several fiducial markers 141 of known size set out in the field of view 103.

In other embodiments, system 120 may automatically determine the configuration of camera 101 using one or more sensors incorporated into system 100 or used by an operator. For example, camera 101 may include a digital level or a sensor to determine the height of camera 101. In such embodiments, the height of the camera and the angle of the camera from vertical may be combined into a mathematical function for determining the location of any observed contact with the ground plane (or other reference point) based on the relative position within the captured image. In certain embodiments, a POLHEMUS tracking system may be used to determine configuration of the camera.

B. Calibrating Camera Image 200 for Determining 3D Locations of Participants.

As mentioned above, system 100 may generate or access one or more formulas and/or look-up tables for determining a 3D physical location of a participant 130 based on the location (e.g., pixel) of the participant 130 within an image 200 captured by camera 101. For example, system 100 may generate an algorithm or look-up table to convert each pixel of background image 202 to a 3D physical location, which algorithm or look-up table may be used to determine the 3D physical position of a participant contour 201 (e.g., based on the location of ground contact point 260 within image 200). Alternatively, system 100 may generate an algorithm or look-up table to convert a distance (in pixels) from an edge of image 202 to 3D physical locations, which algorithm or look-up table may be used to determine the 3D physical position of a participant contour 201 (e.g., by measuring the distance in pixels between ground contact point 260 of participant contour 201 and an edge of image 200). Alternatively, system 100 may generate an algorithm or look-up table to convert a distance (in pixels) from a reference marker (e.g., marker 140 or 141) to 3D physical locations, which algorithm or look-up table may be used to determine the 3D physical position of a participant contour 201 (e.g., by measuring the distance in pixels between ground contact point 260 of participant contour 201 and the reference marker).

The algorithms or look-up tables discussed above may be generated based on particular geometric relationships shown in FIG. 2 and FIG. 3. For example, computer system 120 may generate an algorithm or look-up table to determine the ground-level distance to a participant 130 (e.g., distance b or distance b+x shown in FIG. 3) based on the pixel distance V (FIG. 2) between ground contact point 260 and the lower edge of image 200.

Similarly, computer system 120 may generate an algorithm or look-up table to determine the lateral location of a participant 130 based on the pixel distance between ground contact point 260 (or other point on participant contour 201) and the left or right edge of image 200.

In other embodiments, computer system 120 may generate an algorithm or look-up table to determine both (a) the ground-level distance to a participant 130 (e.g., distance b or distance b+x shown in FIG. 3) and (b) the lateral location of the participant 130 based on the pixel location of ground contact point 260 (or other point on participant contour 201) within image 200, accounting for both the vertical and horizontal location of such pixel.

C. Calibrating Camera Image 200 for Determining Participant Height.

As mentioned above, system 100 may generate or access one or more formulas and/or look-up tables for determining a height of a participant 130 based on (a) aspects of the participant contour 201 (e.g., the distance between the bottom and topmost points 260 and 261 of contour 201) and/or (b) the location of participant contour 201 within image 200. For example, system 100 may generate an algorithm or look-up table to convert a vertical dimension of a participant contour 201 (e.g., the distance between ground contact point 260 and top contour point 261) into a height of participant 130. Such algorithm or look-up table may be generated based on particular geometric relationships shown in FIG. 3, or based on assumptions about participant height as a matter of distance between ground contact point 260 and top contour point 261 given the position and orientation of camera 101 (or based on a typical camera position and orientation).

In some embodiments, the participant height calibration is performed after the participant location calibration. Similar to the participant location calibration, the participant height calibration may be manual, semi-automatic, or fully automatic. An example of semi-automatic calibration is provided as follows. A pole having a camera-recognizable marking at a known height on the pole may be held vertically at various ground locations in the camera's field of view 103. At each location, computer system 120 may generate an image 202, determine the 3D location of the pole on the ground (e.g., using a location algorithm or look-up table discussed above), and determine the height (in pixels) of the marking on the pole. System 100 may use data collected in this manner to generate an algorithm or look-up table to convert a measured height (in pixels) of a participant contour 201 to an actual or relative height based on the 3D physical location of the participant contour 201.

D. Calibrating Participant Depth.

As mentioned above, system 100 may generate or access one or more formulas and/or look-up tables for determining a depth (e.g., dimension a shown in FIG. 3) for which to extrude participant contour 201 to generate a virtual 3D representation of participant 130 (e.g., virtual 3D participant 155 shown in FIG. 1) for use in virtual 3D scene 130. This extrusion depth may be determined based on various factors. For example, system 100 may determine the extrusion depth for a particular participant 130 based on any one or more of the following factors:

(a) the physical location of the participant (e.g., as determined using a location algorithm or look-up table discussed above);

(b) the height of the participant (e.g., as determined using a height algorithm or look-up table discussed above);

(c) a width or other dimension of the participant (e.g., as determined using an algorithm or look-up table similar to those discussed above);

(d) the type of participant (e.g., person, animal, cart, etc.) identified by camera 101 (e.g., by comparing the participant contour with a number of pre-defined reference contours);

(e) the orientation of the participant (e.g., whether a human participant 130 is facing camera 101 directly or sideways, which system 100 may determine automatically by comparing the participant contour with a number of pre-defined reference contours corresponding to various orientations); and/or (f) any other suitable factors.

In other embodiments, the extrusion depth may be a standard pre-determined depth for all participants 130.

In some embodiments computer system 120 may apply certain assumptions in generating particular algorithms or look-up tables. Generally, the more assumptions used in generating a particular algorithm or look-up table, the less precise the algorithm or look-up table. However, certain assumptions may reduce the complexity of various calculations, resulting in faster processing, which may be desirable in certain applications or depending on the processing power of the relevant system 100.

Identifying a Participant Contour

Once calibrated, system 100 may be used to capture camera images 200 of a participant 130, identify a contour 201 of the participant 130, determine location and/or dimensional data regarding the participant 130, extrude the participant contour 201 to generate a virtual 3D representation of the participant 130 (i.e., virtual 3D participant 155) in a virtual 3D scene 190, and identify and manage interactions between the virtual 3D participant 155 and other virtual 3D objects in the virtual 3D scene 190.

A participant contour 201 (e.g., as shown in FIG. 2) may be a continuous curve or polygon(s) representing the outline of a participant 130. Participant contour 201 may be used as a basis for developing a virtual 3D representation of participant 130 (i.e., virtual 3D participant 155), as discussed below. Participant contour 201 may be determined by computer system 120 in any suitable manner. In one embodiment, participant contour 201 is determined using background subtraction. In this technique, an image of the background is captured before participant 130 enters the camera's field of view 103 (see FIG. 1). This captured image, referred to as background image 202, may be stored in memory 122 (see FIG. 1) for later access. To determine participant contour 201, image 200—which includes participant 130—may be compared pixel by pixel with background image 202. For example, matching pixels may be identified as background pixels and grouped into contiguous clusters. In certain embodiments, a pixel match threshold may be set or adjusted to account for, e.g., variations in lighting conditions and to prevent shadows from being identified as primary objects. Computer system 120 may identify a cluster of non-matching pixels (between image 200 and background image 202) as participant 130.

Each identified cluster may then be traced with a closed polygon line to form participant contour 201. The number of vertices may vary depending on the level of resolution desired. Further, computer system 120 may apply line smoothing and/or contour adjustment, e.g., where there is a concern that some clothing elements may resemble the background (within the pixel matching threshold level) and cause the detected contour of the participant to have a jagged edge that inaccurately describes the participant's contour. Participant contour 201 may also be represented as a series of curves. Participant contour 104 can be determined using various other techniques including, e.g., the use of Sobel filters, Canny edge-detection, and color segmentation.

Computer system 120 may also determine participant contours 201 for multiple participants 130 within field of view 103. If image 200 includes multiple participants 131 in contact with each other or partially obscuring each another, computer system 120 may identify a single cluster corresponding to the multiple participants 131 and generate a single participant contour for the multiple participants 130. In other embodiments, computer system 120 may recognize that there are multiple contacting/overlapping participants 130 in image 200 and apply a suitable algorithm for estimating a separate participant contour for each participant 130. If image 200 includes multiple participants 130 that do not overlap each other, computer system 120 may identify each of participants 130 and generates a separate participant contour for each identified participant 130.

Determining the Participant's Location and/or Dimensions

Computer system 120 may combine the participant contour 201 with location and/or dimension data regarding participant 130 to generate a virtual 3D representation of participant 130 (i.e., virtual 3D participant 155) in virtual 3D scene 190. Such participant location and/or dimension data may include, e.g., any one or more of the following: (a) a 3D location of participant 130, (b) a height of participant 130, (c) a width of participant 130, (d) a depth of participant 130, and (e) any other physical location, dimension, and/or shape of participant 130.

Computer system 120 may determine each type of participant location and/or dimension data in any suitable manner. For example, computer system 120 may determine various participant location and/or dimension data based on the location of one or more points on participant contour 201 in image 200. Computer system 120 may apply any suitable algorithms and/or look-up tables for determining participant location and/or dimension data based on such point(s) on participant contour 201, including, e.g., any one or more algorithms and/or look-up tables that may be generated by system 100 as discussed above in the "System Calibration" section. In particular, computer system 120 may access one or more algorithms and/or look-up tables stored in memory 122, and apply such accessed algorithms and/or look-up tables to the relevant point(s) of participant contour 201 using processor 121.

Participant contour 201 may include one or more points used for determining a various location and/or dimension data of participant 130. In this example, participant contour 201 includes a ground contact point 260 and a top contour point 261. Ground contact point 260 represents the point where participant 130 touches the ground plane 250, typically the lowest point on participant contour 201. Ground contact point 260 may be used in determining various information, e.g., a 3D location of participant 130, the distance between camera 101 and participant 130, the height of participant 130, etc. Top contour point 261 represents the topmost point on participant contour 201, here the top of the participant's head. Top contour point 261 may be used along with ground contact point 260 to determine an approximate height of participant 130. Example uses of ground contact point 260 and top contour point 261 for determining various location and/or dimension data of participant 130 (which may then be used by computer system 120 for generating virtual 3D participant 155 in virtual scene 190) are described below in greater detail.

Ground contact point 260 and/or top contour point 261 may be used in various ways for determining various location and/or dimension data of participant 130, depending on the embodiment.

Extruding the Participant Contour to Generate a Virtual 3D Participant

System 100 may extrude participant contour 201 to generate a solid volume 306 for a virtual 3D representation of the participant 130 (i.e., virtual 3D participant 155) in virtual 3D scene 190.

Figure 4:
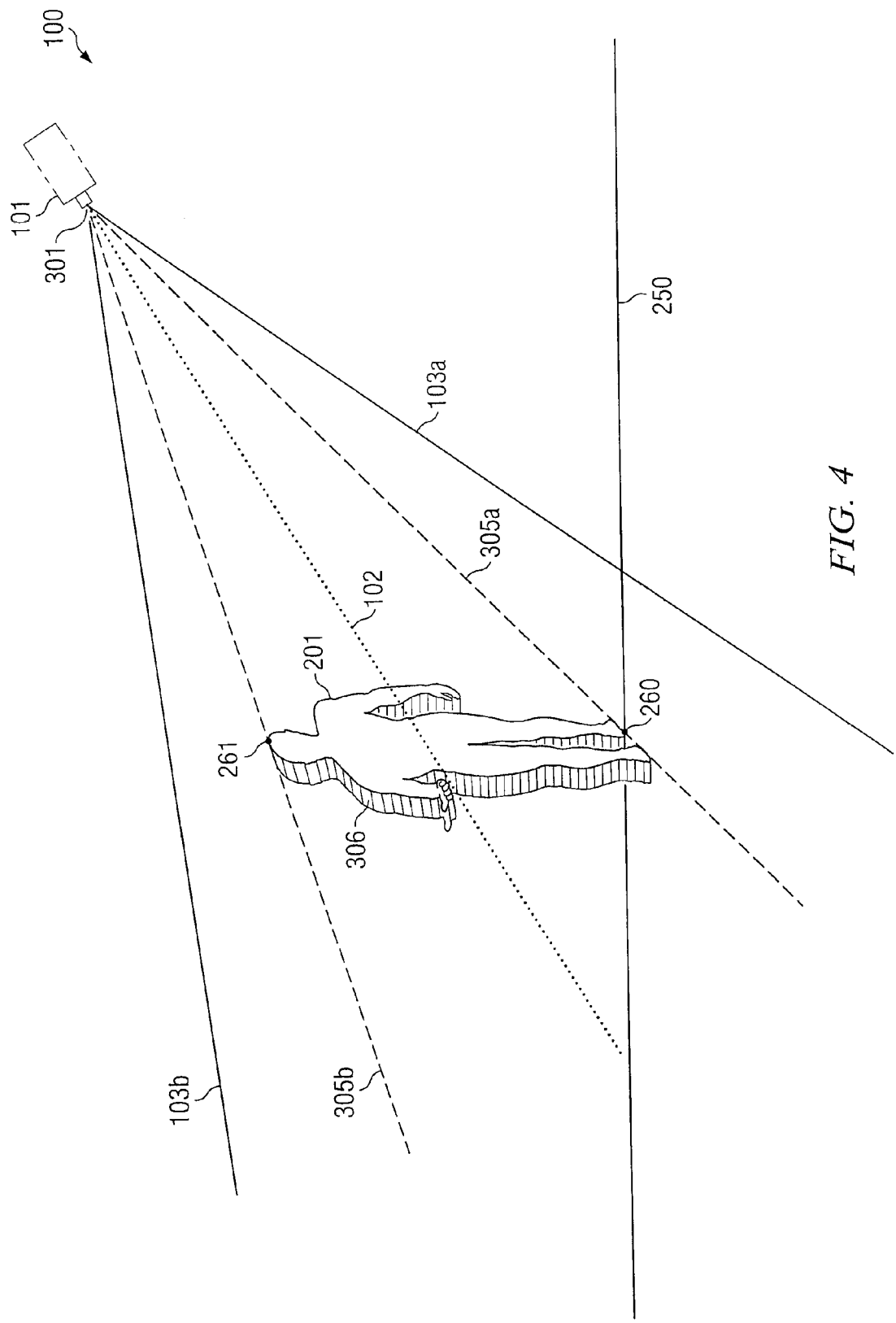
FIG. 4 illustrates a 3D view of an example extrusion of participant contour by a uniform depth to generate a solid volume, according to one embodiment of the present disclosure.
Figure 6:
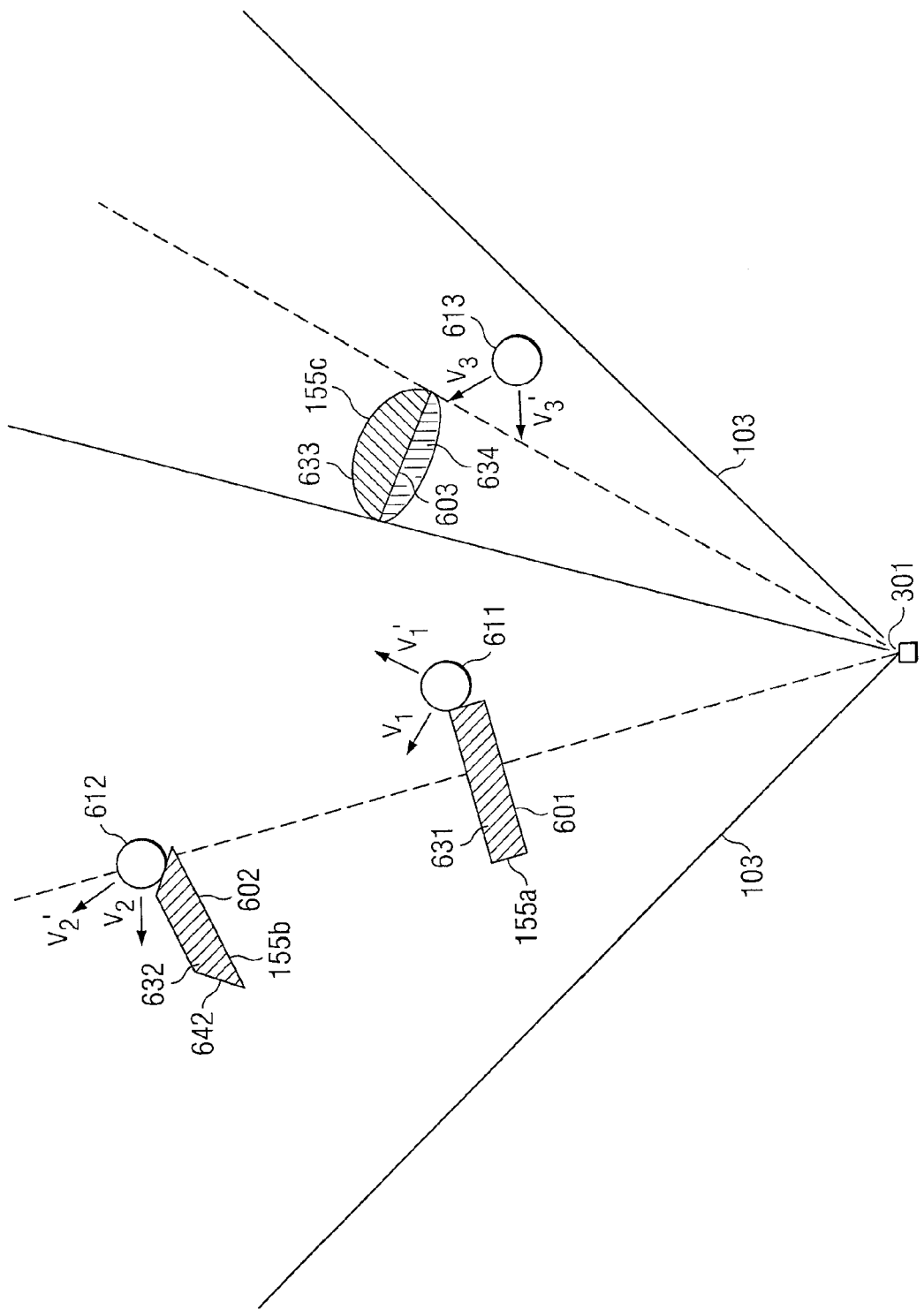
FIG. 6 illustrates a top-down view illustrating various extrusion techniques for generating a virtual 3D participant and their impact on interactions between the generated virtual 3D participant and other virtual objects in a virtual 3D scene, according to certain embodiments of the present disclosure.
Figure 7:
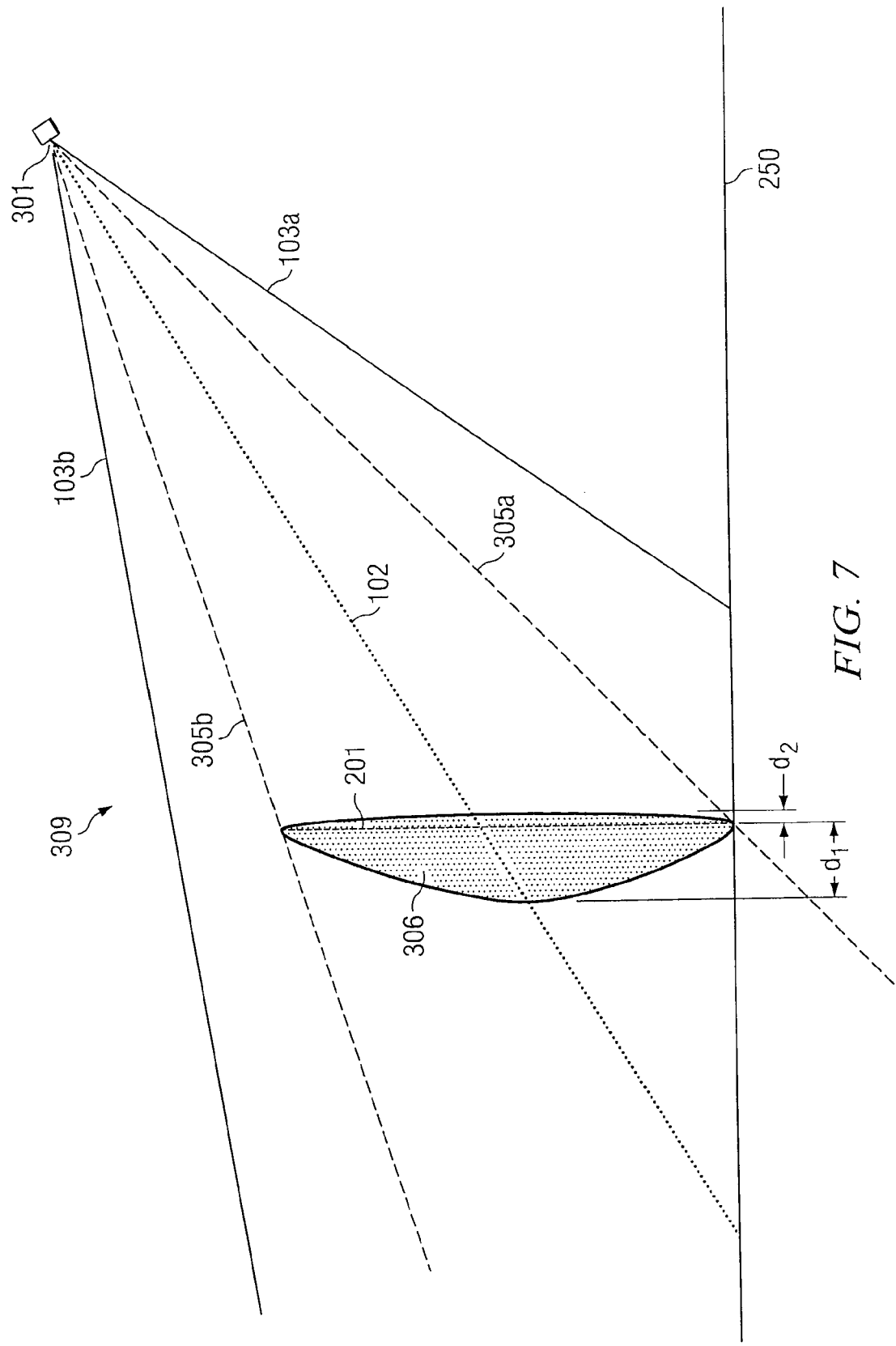
FIG. 7 illustrates a side view of a curved, non-uniform depth, bidirectional extrusion of a participant contour, according to certain embodiments of the present disclosure.

System 100 may extrude participant contour 201 by a uniform depth (e.g., as shown in FIGS. 3, 4, and 6) or non-uniform depth (e.g., as shown in FIGS. 6 and 7). The extrusion depth may be determined in a suitable manner. For example, system 100 may apply a standard extrusion depth for all participants 130. Alternatively, system 100 may determine an extrusion depth for a particular participant 130 based on various factors, e.g., (a) the physical location of the participant (e.g., as determined using a location algorithm or look-up table discussed above);

(b) the height of the participant (e.g., as determined using a height algorithm or look-up table discussed above);

(c) a width or other dimension of the participant (e.g., as determined using an algorithm or look-up table similar to those discussed above);

(d) the type of participant (e.g., person, animal, cart, etc.) identified by camera 101 (e.g., by comparing the participant contour with a number of pre-defined reference contours);

(e) the orientation of the participant (e.g., whether a human participant 130 is facing camera 101 directly or sideways, which system 100 may determine automatically by comparing the participant contour with a number of pre-defined reference contours corresponding to various orientations); and/or (f) any other suitable factors.

FIG. 3 illustrates a side view of an example extrusion of participant contour 201 by a uniform depth to generate a solid volume 306, according to one embodiment of the present disclosure. The extruded volume 306 is illustrated as a trapezoid with a uniform extrusion depth of a bounded at the top and the bottom by the cone represented by lines 305a and 305b.

System 100 may attempt to select an extrusion depth that approximates the actual depth of participant 130. However, the extrusion depth selected by system 100 may be greater than or less than the actual side view depth of participant 130. The trapezoidal shape of extruded volume 306 results from an extrusion of the participant contour 201 orthogonal to the ground 250. The plane of extrusion may also be orthogonal to ray 102, which may in some instances reduce distortion when applying textures to the resulting 3D virtual 3D participant 155.

FIG. 4 illustrates a 3D view of an example extrusion of participant contour 201 by a uniform depth to generate a solid volume 306, according to one embodiment of the present disclosure. In this embodiment, participant contour 201 is extruded at the top along the upper cone boundary 305b, and at the bottom by ground plane 250, rather than lower cone boundary 305a (in contrast to the extrusion shown in FIG. 3). Such extrusion may be desirable in certain applications, e.g., to prevent a physical interference between the bottom region of virtual 3D participant 155 and the virtual ground or floor.

Generating 3D Virtual Scene 190 Including Virtual 3D Participant and Interactions Computer system 120 may generate a 3D virtual scene 190 including virtual participant 155 generated according to the techniques discussed herein in virtual 3D scene 190, and determine and manage various interactions between virtual 3D participant 155 and other virtual elements, e.g., one or more external virtual 3D objects, one or more other virtual 3D participants 155 within the camera's field of view 103, a background (reality-based or virtual), and/or any other virtual elements (e.g., light, fog, wind, etc.). Computer system 120 may incorporate a 3D graphics framework and real-time physics engine for generating 3D virtual scene 190 and identifying and managing interactions between virtual objects.

"External virtual 3D objects" may refer to any virtual 3D objects generated independent from camera image 200. For example, external virtual 3D objects may include pre-defined virtual 3D objects accessed from system memory 122 (e.g., generated by a system designer or operator). External virtual 3D objects may include objects that a participant 130 can only interact with virtually via virtual 3D scene 190, e.g., a virtual ball, virtual bubbles, a cartoon character, a talking parrot, a birthday present, a product offered for sale, etc. External virtual 3D objects may be generated based on real, physical objects, or may be fictional objects. As an example of the former, virtual 3D objects may include a virtual 3D representation of a participant 130 (e.g., a live person) captured by a camera of a different system (i.e., other than system 100).

Computer system 120 may determine and manage various interactions between virtual objects including, for example:

(a) a shadow cast by virtual participant 155 onto another virtual 3D object;

(b) a shadow cast by a virtual 3D object onto virtual participant 155;

(c) a collision or contact between virtual participant 155 and another virtual 3D object;

(d) a partial or total occlusion of virtual participant 155 by another virtual 3D object; and (e) a partial or total occlusion of a virtual 3D object by virtual participant 155; and/or (f) any other type of interactions between virtual participant 155 and one or more other virtual 3D objects.

Figure 5:
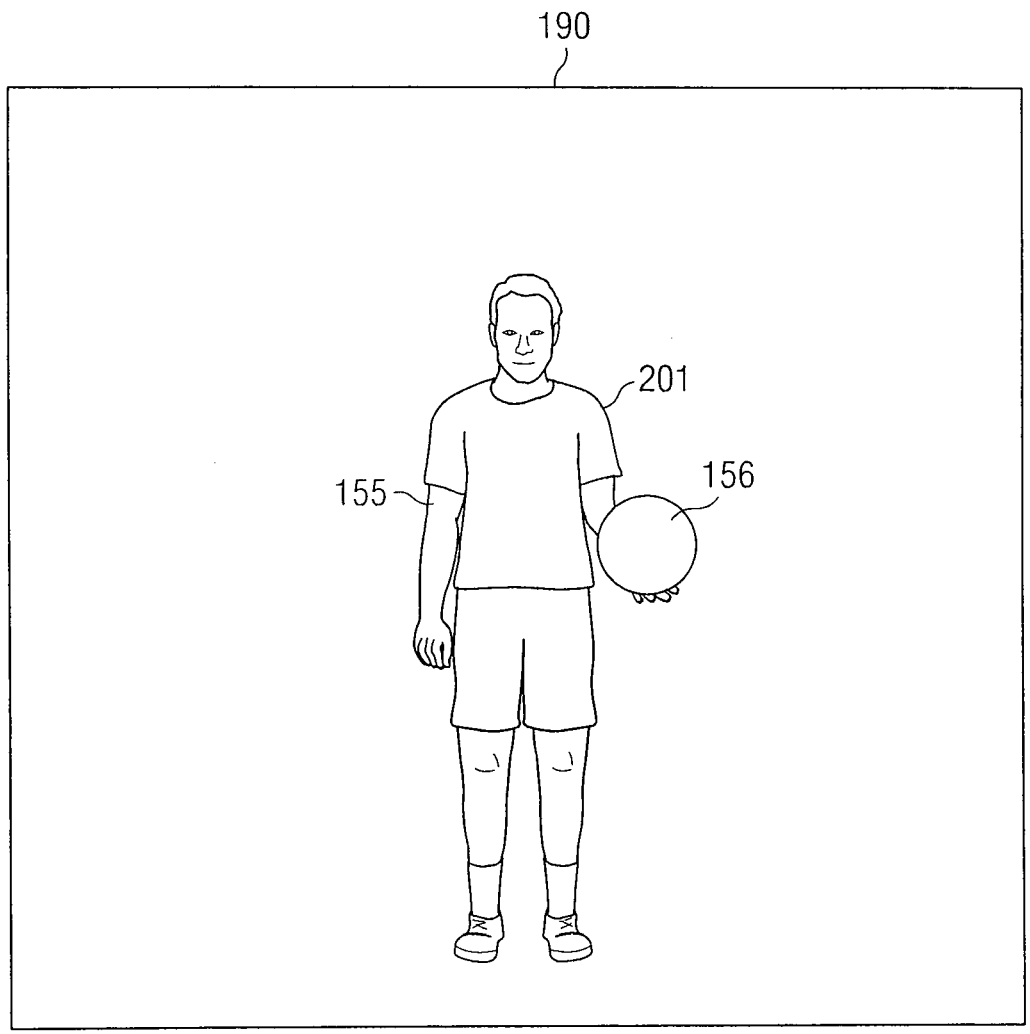
FIG. 5 illustrates an example virtual 3D scene including a virtual 3D participant and a virtual ball, according to an example embodiment of the present disclosure.

FIG. 5 illustrates an example virtual 3D scene 190 including a virtual 3D participant 155 generated according to the techniques discussed herein, and an external virtual ball object 156, according to an example embodiment of the present disclosure. Virtual 3D scene 190 includes a view of 3D virtual participant 155 bound by participant contour 201, and a view of virtual 3D ball 156. Computer system 120 may import the portion of 2D camera image 200 bounded by participant contour 201 into the contour of virtual participant 155. Alternatively, computer system 120 may apply a virtual image (e.g., an avatar) to the contour 210 of virtual 3D participant 155, e.g., in an online gaming environment. Alternatively, computer system 120 may apply some combination of captured camera image data and virtual image data (e.g., a picture of participant 130 wearing a virtual costume) to the contour 210 of virtual 3D participant 155.

Computer system 120 may generate the view of virtual 3D scene 190 using various different techniques. In some implementations, computer system 120 may generate the view of virtual 3D scene 190 by (a) importing the captured camera image 200 (including participant 130 and background image 202) and (b) introducing virtual 3D objects in the camera image 200, e.g., by overlaying visible portions of such virtual 3D objects onto the camera image 200. In other implementations, computer system 120 may generate the view of virtual 3D scene 190 by (a) creating a virtual image including all virtual elements, e.g., a virtual background and any virtual 3D objects (other than virtual 3D participant 155), and (b) introducing virtual 3D participant 155 into the virtual image, e.g., by overlaying visible portions of virtual 3D participant 155 onto the virtual image. In other implementations, computer system 120 may generate the view of virtual 3D scene 190 by (a) combining reality-based objects (e.g., virtual 3D participant 155 and/or background scene 202) with virtual elements (e.g., a virtual background and/or any virtual 3D objects, such as virtual ball 156) in a 3D model, and (b) requesting a view of the 3D model from a particular vantage point, e.g., camera reference point 301. In each of such example implementations, the view of virtual 3D participant 155 may appear identical and may appear to participant 130 as a mirror image of himself.

Virtual ball 156 is shown as a non-limiting example of an external virtual 3D object generated by computer system 120 and introduced into virtual 3D scene 190. A physics engine may control the position and/or movement of virtual ball 156, including any interactions with virtual 3D participant 155. For example, as virtual ball 156 rests on the participant's hand, physics engine 123 may apply an upward force on the ball from the participant's hand to counter the gravitational force on virtual ball 156. Thus, if the participant moves his hand away from virtual ball 156, physics engine 123 (still applying the gravitational force) may cause the ball to fall toward the ground. Furthermore, supposing computer system 120 introduces a virtual wind into virtual 3D scene 190, physics engine 123 may apply the force of the wind to the ball, which may for example cause the ball to fly out of the participant's hand. Likewise, if another external 3D virtual object (e.g., another virtual ball or a virtual person) were to move across virtual 3D scene 190 and strike virtual ball 156, physics engine 123 would control the collision and subsequent movement of virtual ball 156 accordingly to the rules of physics.

Example Contour Extrusion Techniques

FIGS. 6 and 7 illustrate example extrusion techniques for extruding a participant contour 201, according to certain embodiments of the present disclosure.

FIG. 6 illustrates a top-down view illustrating various extrusion techniques for generating a virtual 3D participant and their impact on interactions between the generated virtual 3D participant and other virtual objects in a virtual 3D scene, according to certain embodiments of the present disclosure. Camera reference point 301 is represented with camera field of view boundaries 103.

Three participant contours 601, 602, and 603 are illustrated as lines representing the top-down view of such 2D contours. A different extrusion technique is applied to each participant contour 601, 602, and 603, though the illustrated techniques only represent examples and are not meant to be limiting. Participant contour 601 is extruded straight back away from camera reference point 301 to form a first virtual 3D participant 155a defined by 3D solid 631. Participant contour 602 is extruded away from camera reference point 301, but with beveled side 642 to form a second virtual 3D participant 155b defined by 3D solid 632. And, participant contour 603 is extruded both toward and away from camera reference point 301 by a non-uniform depth to form a third virtual 3D participant 155c defined by 3D solids 634 and 633.

FIG. 6 also illustrates the result of such different extrusions on interactions between the resulting virtual 3D participants 155a, 155b, and 155c and other virtual objects in a virtual 3D scene. To illustrate such different interactions, three virtual 3D objects 611, 612, and 613 are shown. Virtual 3D objects 611, 612, and 613 are moving along initial vectors $V_1$, $V_2$, and $V_3$, respectively, toward virtual 3D participants 155a, 155b, and 155c, respectively. After colliding with virtual 3D participants 155a, 155b, and 155c, virtual 3D objects 611, 612, and 613 are directed along resultant vectors $V_1'$, $V_2'$, and $V_3'$, respectively, as discussed below. These interactions may be controlled by physics engine 123.

The extrusion of participant contour 601 into solid 631 is illustrated as a straight-back extrusion, but could also be a conical extrusion as illustrated in FIGS. 3 and 4 with substantially similar results. This technique may provide the simplest approach to generating a 3D representation from a 2D contour. Additionally, computer system 120 may offset the extruded solid 631 (e.g., by placing solid 631 slightly closer to or further from camera reference point 301) to account for various assumptions about a participant's center of mass relative to the participant's point of contact with the ground as viewed by the camera. If computer system 120 determines that the participant is relatively thin (e.g., by analyzing the participant's contour), system 120 may begin the extrusion at the contour and extrude away from the camera. If computer system 120 determines that the participant is relatively fat, system 120 may offset the extrusion some defined distance towards the camera and extrude further away from the camera than for a thin participant. In either case, this simplistic extrusion technique may result in a virtual 3D participant including square or nearly square edges. When virtual 3D object 611 (e.g., a ball) traveling along vector $V_1$ comes into contact with 3D solid 631, physics engine 123 detects the contact and redirects object 611 away along vector $V_1'$ at an angle that is more severe than if 3D solid 631 embodied the actual 3D shape of the participant.

The extrusion of participant contour 602 into solid 632 is illustrated as a straight-back extrusion, but with beveled rear edges 642. As with the prior technique, the extrusion may be offset to account for the participant's estimated center of mass. This technique introduces some additional complexity, but provides a measured advance in realism in some instances. Here, virtual 3D object 612 traveling along vector $V_2$ contacts solid 632 and deflects at a relatively slight angle illustrated by resulting vector $V_2'$, which may be more realistic (as compared to the non-beveled extrusion of solid 631) given the rounded shape of an actual human body. While solid 632 is illustrated with only one bevel per side, system 120 may apply additional bevels as appropriate. The addition of multiple levels of beveling combined with bidirectional extrusion may approximate the next technique.

The extrusion of participant contour 603 into solids 633 and 634 is illustrated as two curved surfaces more closely resembling the actual body shape of a person. While solid 634 is shown extruded toward the camera, the pair of solids 633 and 634 may be offset toward or away from the camera as discussed above. In this example, virtual 3D object 613 traveling along vector $V_3$ collides with solid 634 and is redirected along new vector $V_3'$ in front of solid 631. In contrast, if extrusion 634 had been omitted, object 613 may be redirected on a course behind solid 631. This technique may be approximated using discrete facets and/or bevels rather than implementing an actual curved surface.

FIG. 7 illustrates a side view of a curved, non-uniform depth, bidirectional extrusion of a participant contour, according to certain embodiments of the present disclosure. Camera 101 is illustrated to provide a reference point and is aimed along ray 102. The camera's field of view is bounded by lines 103*a* and 103*b* originating at camera reference point 301. A cone bounded by lines 305*a* and 305*b* intersects the top and bottom of participant contour 201 (shown in this side view as a vertical line). Extruded solid 306 is shown with a curved, non-uniform depth extending a first distance $d_1$ from participant contour 201 away from camera reference point 301 and extending a second distance $d_2$ from participant contour 201 toward camera reference point 301.

This extrusion technique may more accurately represent certain classes of participants. For example, if a participant is a beach ball or other inflatable object, extruded solid 306 may be adjusted to more closely resemble the actual shape than a solid extruded by a uniform depth. The extrusion in the amount of distances $d_1$ and $d_2$ may be straight towards or away from the camera (along ray 102) or in any other direction. Because extruded solid 306 is curved, the concern of visual anomalies due to extrusion in a direction other than along the line of the camera perspective may be reduced or eliminated.

Example Method of Operation of System 100

Figure 8:
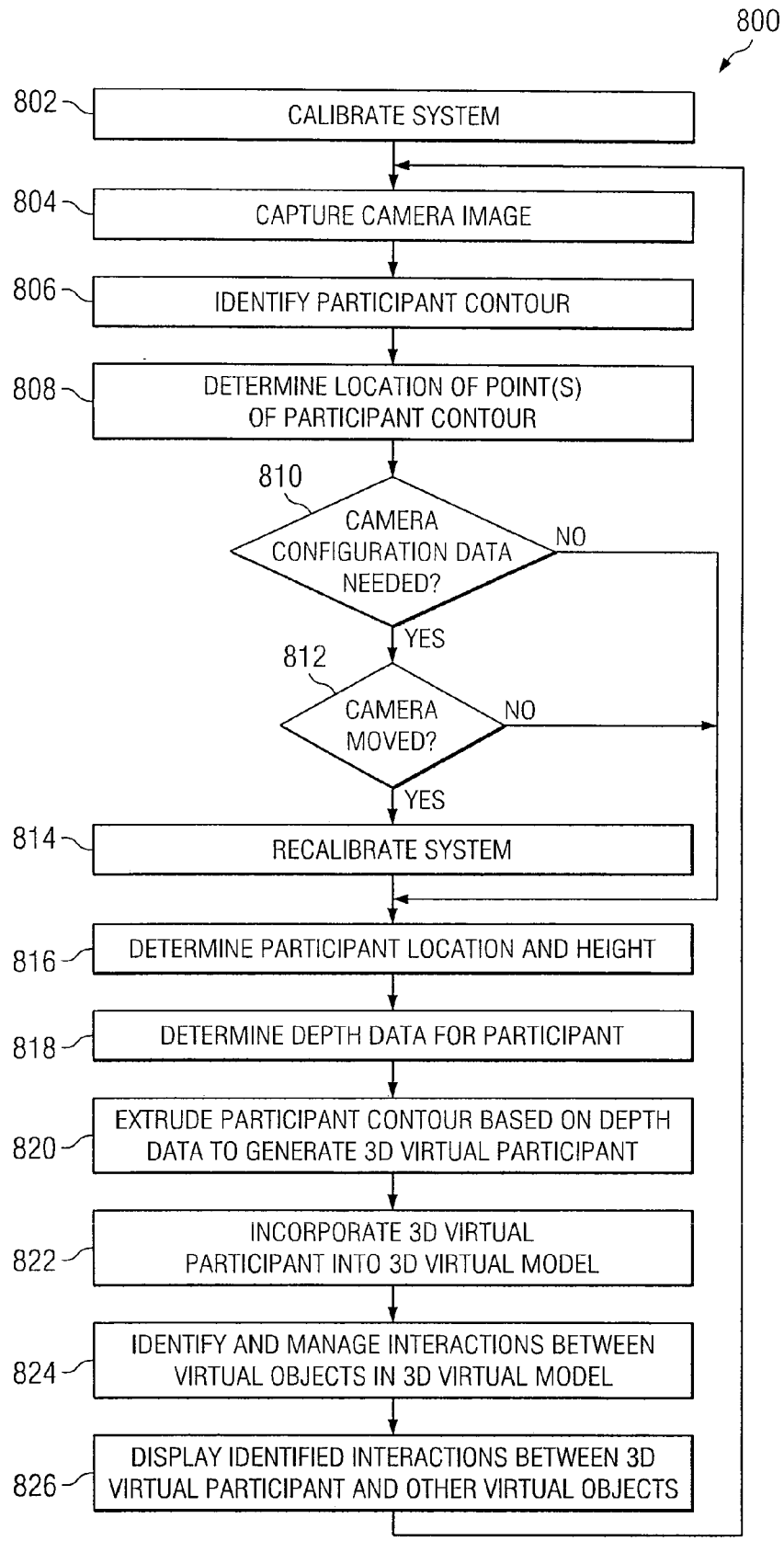
FIG. 8 illustrates an example method for generating a virtual 3D participant from a 2D camera image, generating a 3D virtual scene including the virtual 3D participant, and managing interactions between the virtual 3D participant and other virtual objects, in accordance with certain embodiments of the present disclosure.

FIG. 8 illustrates an example method performed by system 100 for generating a virtual 3D representation of a participant (i.e., a virtual 3D participant) from a 2D camera image, generating a 3D virtual scene including the virtual 3D participant, and managing interactions between the virtual 3D participant and other virtual objects, in accordance with certain embodiments of the present disclosure.

At step 802, various aspects of system 100 are calibrated. Such calibration may include, for example, any one or more of the following:

(a) determining camera configuration data, e.g., a physical location and/or orientation of the camera;

(b) generating or accessing one or more formulas and/or look-up tables for determining a 3D physical location of a participant based on the location (e.g., pixel) of the participant within an image captured by the camera;

(c) generating or accessing one or more formulas and/or look-up tables for determining a height of a participant based on (a) aspects of the participant's contour (e.g., the distance between the bottom and topmost points of the contour) and/or (b) the location of the participant's contour within the camera image;

(d) generating or accessing one or more formulas and/or look-up tables for determining a depth for which to extrude a participant contour to generate a virtual 3D representation of the participant (i.e., a virtual 3D participant) for use in a virtual 3D scene; and/or (e) any other suitable calibrations for determining any location and/or dimension data regarding a participant or other aspect of the system.

At step 804, a camera captures an image and communicates data representing the image to a computer system for analysis. The captured image may be, for example, a full image or data from a video stream from which a full image may be reconstructed. The image may be color or monochrome and may represent visible light or other sensory data (e.g., infrared light or x-ray transmission). The camera or the computer system may reduce the resolution and/or color depth of the captured image to enhance aspects of the system's performance (e.g., processing speed).

At step 806, the computer system may identify a participant contour from the received camera image, e.g., according to any of the techniques described above with respect to FIG. 2. The computer system may store either (a) a representation of the contour outline or (b) a representation of the contour outline including the image data contained in the contour. The former representation may be more useful in the computational aspects of determining the participant's location, while the latter may be mapped to the surface of the extruded participant contour so that participants may see their own images displayed as augmented reality (at step 826).

In some instances, the computer system may identify multiple participants from the captured camera image. The computer system may process all identified participant contours, or select one or more particular participant contours for processing (e.g., by applying any suitable selection rules). In some embodiments, system operators may wear computer-system-recognizable markers to indicate to the computer system that they should be ignored. Alternatively, people wishing to participate with system 100 may be required to wear markers indicating that they should be included. In some embodiments, system operators may wear special clothing (e.g., solid blue coveralls) such that the computer system automatically ignores the system operators, e.g., using a suitable contour detection algorithm. This special clothing may allow the system operators to remain invisible on the 3D virtual display and incapable of interacting with any virtual objects in 3D virtual display.

At step 808, the computer system may identify one or more points of interest on the participant contour that may be used (e.g., at step 816) for determining the location and/or dimensional aspects of the participant. For example, the computer system may identify the lowest point on the contour as a primary reference point defining where the participant is in contact with the ground. Alternatively, the primary reference point may be a point where the participant is touching a wall or some other predetermined contact point. For example, participants may be informed that to appear in the augmented reality experience, they must first touch a spot on the wall or on a railing. As another example, the computer system may identify the top point on the contour, which may be used (e.g., at step 816) for determining a height of the participant.

At step 810, if camera configuration data needed for determining the location and/or dimensional aspects of the participant (at step 816), the method may proceed to step 812. If not, the method may proceed to step 816.

At step 812, the computer system may determine whether the camera has physically moved since some prior time (e.g., a previous iteration of method 800). If so, the computer system may recalibrate one or more aspects of the system at step 814, including, e.g., determining updated camera configuration data (e.g., an updated physical location and/or orientation of the camera), and/or any algorithms or look-up tables that depend on the current camera configuration.

Alternatively, if the computer system determines that the camera has not moved, the method may proceed to step 816. At step 816, the computer system determines the location and/or dimensional aspects (e.g., height, width, stance) of the participant based on (a) the point(s) of interest identified at step 808, and/or (b) camera configuration determined at step 802 and/or 814, and/or (c) any other relevant data. The computer system may use any of the techniques described herein, e.g., the various techniques described with reference to FIGS. 2 and 3.

At step 818, the computer system determines depth data for extruding the participant contour. The computer system may use any of the techniques described herein. For example, the system may apply a standard extrusion depth for all participants. Alternatively, system may determine a uniform or non-uniform extrusion depth for the participant based on one or more factors, for example:

(a) the physical location of the participant (e.g., as determined at step 816);

(b) the height of the participant (e.g., as determined at step 816);

(c) a width or other dimension of the participant (e.g., as determined at step 816);

(d) the type of participant (e.g., person, animal, cart, etc.);

(e) the orientation of the participant (e.g., whether the participant is facing camera directly or sideways); and/or (f) any other suitable factors.

In some embodiments, depth data may be determined using a formula that incorporates multiple factors. For example, the system may apply a formula to compare the relative width and height of the participant contour to determine whether the participant is standing sideways or facing the camera. If the system determines that the participant is facing sideways, the system may select a greater depth than if the participant is determined to be facing the camera. In another example, the system may recognize (based on the size and/or shape of the contour) that the contour likely includes two or more people partially obscuring each other—and thus appearing to the system as a single participant. In such situation, the system may assign the contour a depth corresponding to a single person. In some embodiments, the system may attempt to classify the participant and generate an extrusion depth accordingly. For example, the system may identify a participant as a ball, and accordingly assign a depth equal to the width of the ball.

At step 820, the computer system may extrude the participant contour to generate a 3D solid for a virtual 3D representation of the participant (i.e., a virtual 3D participant). The system may extrude the participant contour in a uniform or non-uniform manner based on the depth data determined at step 818. Where multiple participants are identified from the camera image, the system may apply the same extrusion technique and/or depth data for all participant contours or may apply different extrusion techniques and/or depth data for different participant contours, based on some classification of each participant. Examples of extrusion techniques are described above, especially in reference to FIGS. 3, 4, 6, and 7.

At step 822, the computer system may incorporate the virtual 3D participant generated at step 820 into a 3D virtual model. The 3D virtual model may include the virtual 3D participant and one or more other virtual elements, e.g., one or more external virtual 3D objects, one or more other virtual 3D participants within the camera's field of view 103, a background (reality-based or virtual), and/or any other virtual elements (e.g., light, fog, wind, etc.). The computer system may utilize any suitable 3D rendering framework, e.g., OpenGL™ or DirectX™.

At step 824, the computer system may determine interactions between the virtual 3D participant and one or more other virtual elements in the 3D virtual model. Example interactions may include:

(a) a shadow cast by the virtual participant onto another virtual 3D object;

(b) a shadow cast by a virtual 3D object onto the virtual participant;

(c) a collision or contact between the virtual participant and another virtual 3D object;

(d) a partial or total occlusion of the virtual participant by another virtual 3D object; and (e) a partial or total occlusion of a virtual 3D object by the virtual participant; and/or (f) any other type of interactions between the virtual participant and one or more other virtual 3D objects.

Specific example interactions are described above with reference to FIGS. 5 and 9 (e.g., casting shadows, colliding, deflecting, and obscuring).

In some embodiments, computer system utilizes a 3D rendering framework (e.g., OpenGL™ or DirectX™) to determine and visualize these interactions. In some embodiments, computer system utilizes a real-time physics engine (e.g., Open Physics Abstraction Layer, Bullet, or Simulation Open Framework Architecture) to control the movement and physical interactions of virtual 3D objects in the 3D virtual model. For example, the real-time physics engine may apply gravity forces to virtual objects, and control deflections, deformations, cleaving, sticking, or other interactions resulting from collisions between virtual 3D objects.

At step 826, the computer system may display the interactions between the virtual 3D participant and other virtual element(s) determined at step 824. In some embodiments, the computer system may display a 3D virtual scene that displays the virtual 3D participant and other virtual 3D elements in the 3D virtual model, as well as interactions between such virtual 3D elements. In other embodiments, the 3D virtual scene may include only portions of the virtual 3D participant, or an indirect or abstracted representation of the virtual 3D participant. In other embodiments, the 3D virtual scene may display indirect or abstracted interactions between the virtual 3D participant and other virtual element(s). For example, suppose an implementation in which a participant can operate a hula hoop. The system may display the hula hoop but not the participant (i.e., the hula hoop may appear to be floating in space). A virtual 3D participant is generated for the participant. As the participant moves her hips, the virtual 3D participant interacts with the hula hoop, causing the hula hoop to move in circles. The interaction—i.e., the movement of the hula hoop caused by the participant moving her hips—is displayed to the participant.

In some embodiments, the system may include a large screen or monitor for displaying the 3D virtual scene in view of the participant. This allows the participant to see the interactions and respond accordingly. For example, in the virtual bubble room scenario, a participant may want to catch or pop a virtual bubble, but can only see the virtual bubble in the 3D virtual scene displayed on the screen. In this embodiment, the 3D virtual scene may appear to the participant as a mirror augmented with virtual elements.

The method may then return to step 804. The method of steps 804-826 may be repeated any number of times and at any frequency. Steps 804-826 may be performed in real time or substantially in real time such that a participant may view her movements and/or interactions with virtual objects in a displayed 3D virtual scene in real time or substantially in real time.

Example 3D Virtual Scenes with Virtual Interactions

Figure 9:
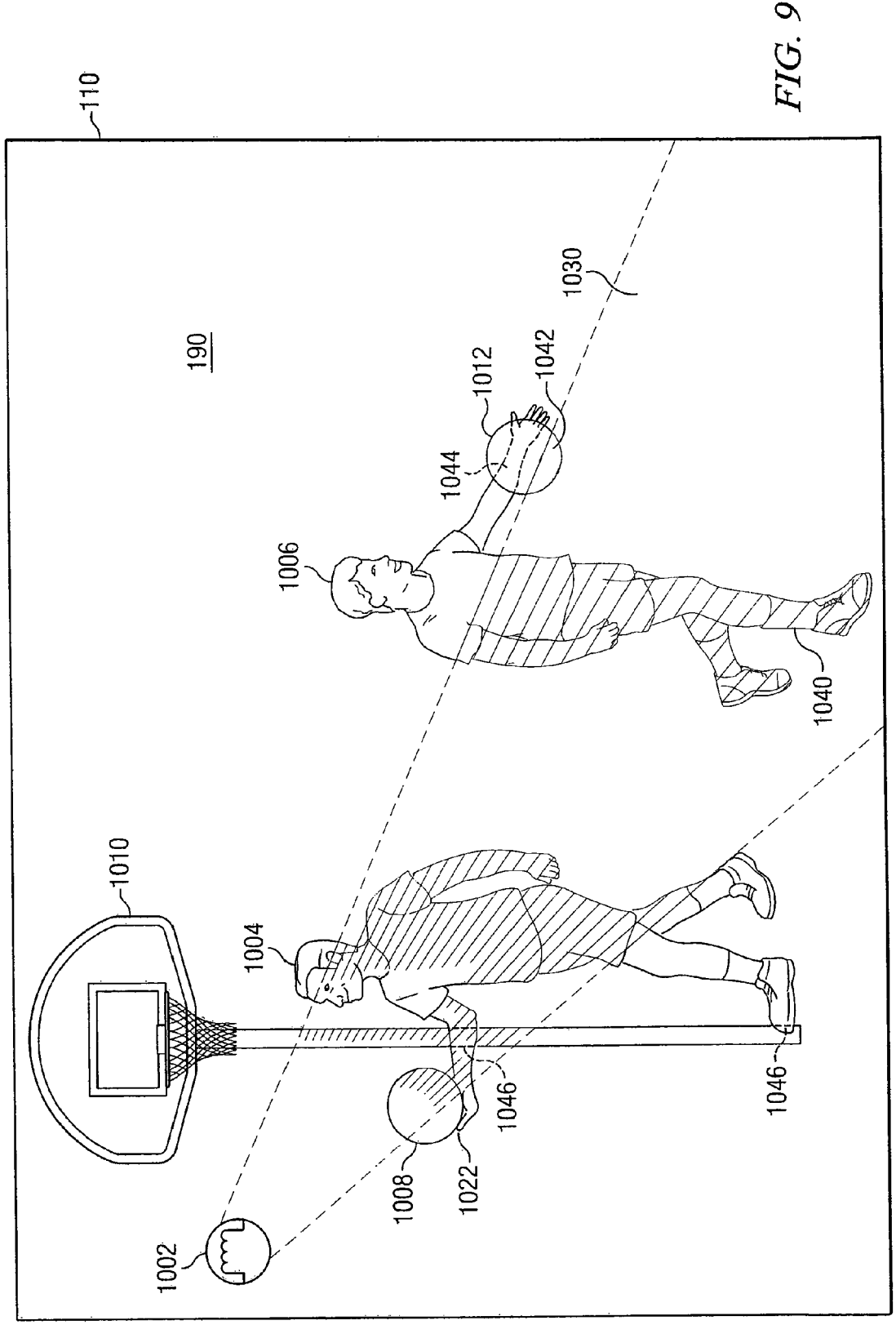
FIG. 9 illustrates an example 3D virtual scene including various types of interactions between virtual 3D elements, according to certain embodiments of the present disclosure.

FIG. 9 illustrates the display of an example 3D virtual scene 190 including various types of interactions between virtual 3D elements, according to certain embodiments of the present disclosure. Virtual scene 190 may be viewed on any suitable display 110. In this example, the system provides a game allowing participants to shoot virtual basketballs into a virtual basketball goal. A virtual light source 1002 casts a bright light on various virtual 3D element including virtual 3D participants 1004 and 1006, virtual basketballs 1008 and 1012, and virtual basketball goal 1010. Various example interactions are illustrated as follows. Virtual basketball 1008 rests on the hand of virtual 3D participant 1004 at 1022. Basketball goal 1010 is obscured by the arm and foot of virtual 3D participant 1004 at locations 1046. Virtual 3D participant 1004 casts a shadow on virtual 3D participant 1006 at 1040; on virtual basketball 1012 at 1042; and on the virtual ground at 1030. Finally, virtual basketball 1012 obscures part of the arm of virtual 3D participant 1006 and may be deflected by the same at 1044. These example interactions are discussed more fully as follows.

Virtual basketball 1008 rests on the hand of virtual 3D participant 1004 at 1022. In some embodiments, a real-time physics engine 123 applies a downward gravitational pull on purely virtual basketball 1008. Here, a portion of the virtual 3D participant 1004 counters that force and prevents the ball from dropping. In some embodiments, the physics engine 123 may provide a measure of adhesive force (e.g., "stickiness") to interactions between virtual basketballs 1008 and 1012 and the participants' hands to make it easier for the participants to hold the virtual basketballs (e.g., as it is difficult to actually determine whether a participant's hand is sufficiently large and level (or cupped) to prevent a virtual ball from rolling off).

As mentioned above, virtual 3D participant 1004 casts a shadow on virtual 3D participant 1006 at 1040; on purely virtual basketball 1012 at 1042; and on the virtual ground at 1030. The shadow may be formed by extending virtual rays of light from virtual light source 1002 across the virtual 3D scene. Where the rays of light intersect with a virtual 3D object, e.g. virtual 3D participant 1004, the intersection point may have an increased brightness (possibly from complete darkness if virtual light source 1002 is the only light source in the virtual 3D scene). Portions of virtual 3D objects further from virtual light source 1002 along the same ray, which is blocked by virtual 3D participant 1004, will accordingly not be brightened.

Finally, virtual basketball 1012 obscures the arm of virtual 3D participant 1006 and may be deflected by the same at 1044. This deflection may also cause a visible deformation of virtual basketball 1012. If virtual basketball 1012 is translucent, it may not completely obscure the arm of virtual 3D participant 1006 at 1044, but may instead alter the arm's appearance by blurring and/or altering its color.

Figure 10:
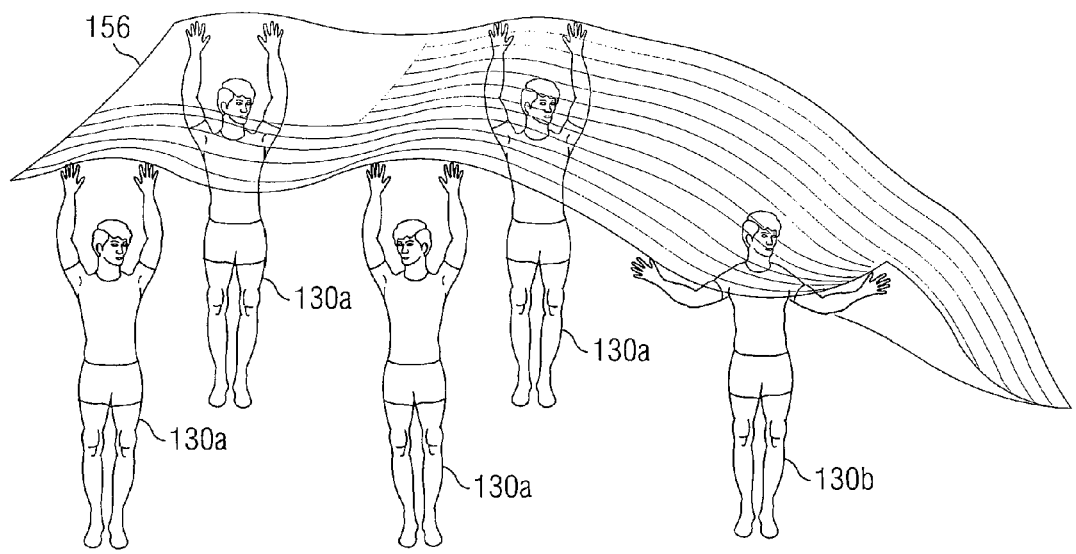
FIG. 10 illustrates the display of an example 3D virtual scene including several virtual 3D participants interacting with one external virtual 3D object, according to certain embodiments of the present disclosure.

FIG. 10 illustrates the display of an example 3D virtual scene including several virtual 3D participants interacting with one external virtual 3D object, according to certain embodiments of the present disclosure. Virtual scene 190 may include multiple participants 130*a* and participant 130*b* (5 total participants are illustrated in this example). The participants 130*a* and 130*b* are interacting with external virtual 3D object 156 (e.g., a virtual flag). Participants 130*a* may be people with their arms stretched upward to hold up virtual flag 156. Participant 130*b* may be a person with arms stretched outward, rather than upward, with virtual flag 156 resting on participant 130*b* 's head. One corner of the flag (the upper right-hand corner of FIG. 10) is unsupported by any participant and may sag accordingly.

In some embodiments, computer system 120 may use a physics engine to apply a gravitational force on virtual flag 156 forcing the flag downward until supported by a participant or the ground. In such an embodiment, the physics engine would cause the unsupported corner to fall to the ground and cause the corner supported by participant 130*b* to be lower than the portions of virtual flag 156 supported by participants 130*a* with upward stretched hands. The physics engine may employ a modified set of physics rules to prevent all of the edges of virtual flag 156 from hanging limply, as might be the case with a real, textile flag held up by five people in the same arrangement. Alternatively, virtual flag 156 may be modeled as having physical characteristics resembling a sturdier material such as poster board to achieve the same effect. In other embodiments, computer system 120 may plot a 3D contour based on the top points of participants 130*a* and 130*b* to visualize the shape of virtual flag 156, thereby obviating the need for a physics engine.

Figure 11:
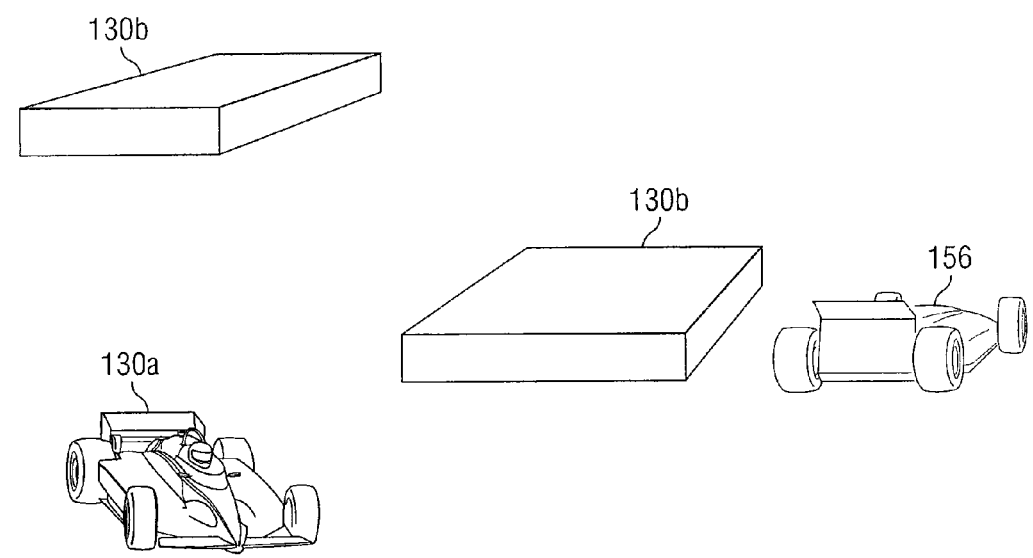
FIG. 11 illustrates the display of an example 3D virtual scene including several virtual 3D participants interacting with one external virtual 3D object, according to certain embodiments of the present disclosure.

FIG. 11 illustrates the display of an example 3D virtual scene including several virtual 3D participants interacting with one external virtual 3D object, according to certain embodiments of the present disclosure. Virtual scene 190 may include participant 130*a* and participants 130*b* (3 total participants are illustrated in this example). Participant 130*a* is a radio controlled car, e.g., one set into the field of view by a person and driven around on the ground. Participant 130*a* is drive around participants 130*b*, e.g., semi stationary barrier blocks made of foam or cardboard in a race course. The race course may be painted or marked with tape or may only appear on the display of the virtual 3D scene. External virtual 3D object 156 is a virtual race car driving through the same course.

In some embodiments, computer system 120 may use a physics engine to apply inertial forces to virtual car 156 when virtual car 156 collides with remote controlled car 130*a* or barriers 130*b*. For example, if remote controlled car 130*a* attempts to overtake virtual car 156, computer system 120 may cause virtual car 156 to lurch forward, upward and to the side before spinning out. While systems may exist to alter the position, speed, direction, level, and or other physical characteristics of remote controlled car 130*a* as a result of the same interaction, such a system is not part of this specific example. Furthermore, if remote controlled car 130*a* were to collide with barrier 130*b*, barrier 130*b* may move as a result (i.e., the car physically strikes and moves the barrier). Because barrier 130*b* is a participant, computer system 120 will recognize the new position of barrier 130*b* and reflect that position in the 3D virtual representation maintained internally and displayed. In other embodiments, a physics engine is not employed and collisions may be displayed as overlapping 3D virtual objects, much like old video games sometimes did.

In some embodiments, barriers 130*b* may be specifically colored, shaded, or lighted. In such an embodiment, computer system 120 may distinguish between the contour of remote controlled car 130*a* and the contour of barrier 130*b* when remote controlled car 130*a* is between the camera and barrier 130*b* and is partially obscuring barrier 130*b*. In these embodiments, barriers 130*b* are still recognizable to computer system 120 and may interact with the 3D virtual representation of remote controlled car 130*a* and virtual car 156.

As stated above, although the disclosed embodiments are described in detail in the present disclosure, it should be understood that various changes, substitutions and alterations can be made to the embodiments without departing from their spirit and scope.

What is claimed is:

1. A computer implemented method for incorporating a representation of a participant into a virtual 3D environment, comprising:
   receiving an image captured by a camera, the image including a participant;
   automatically determining a contour of the participant;

automatically associating depth data with the contour of the participant;

automatically generating a first virtual 3D representation of the participant by extruding the contour based on the associated depth data;

determining a physics interaction between the first virtual 3D representation of the participant and a second virtual 3D representation of a second object based at least on the extruded contour, wherein the physics interaction comprises a force vector;

and automatically causing a display of the interaction between the first virtual 3D representation of the participant and the second virtual 3D representation of a second object based at least on the extruded contour, wherein the computer implemented method is performed substantially in real-time.

2. The computer implemented method of claim 1 wherein determining the physics interaction between the first virtual 3D representation of the participant and the second virtual 3D representation of the second object based at least on the extruded contour is performed at least in part by a real-time physics engine.

3. The computer implemented method of claim 1 wherein the physics interaction between the first virtual 3D representation of the participant and the second virtual 3D representation of the second object comprises a collision or contact between the first virtual 3D representation of the participant and the second virtual 3D representation of the second object.

4. A computing system comprising:
a processor;
a memory coupled to the processor; and
an interactive media subsystem enabled to:
    receive an image captured by a camera, the image including a participant;
    automatically determine a contour of the participant;
    automatically associate depth data with the contour of the participant;
    automatically generate a first virtual 3D representation of the participant by extruding the contour based on the associated depth data;
    determine a physics interaction between the first virtual 3D representation of the participant and a second virtual 3D representation of a second object based at least on the extruded contour, wherein the physics interaction comprises a force vector; and
    automatically cause a display of the interaction between the first virtual 3D representation of the participant and the second virtual 3D representation of a second object based at least on the extruded contour;
wherein the interactive media subsystem operates substantially in real-time.

* * * * *